US008228935B2

(12) United States Patent
Tsirtsis (Georgios) et al.

(10) Patent No.: US 8,228,935 B2
(45) Date of Patent: Jul. 24, 2012

(54) MIP/PMIP CONCATENATION WHEN OVERLAPPING ADDRESS SPACE ARE USED

(75) Inventors: George Tsirtsis (Georgios), London (GB); Gerardo Giaretta, San Diego, CA (US); Lorenzo Casaccia, Rome (IT); Kalle I. Ahmavaara, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 716 days.

(21) Appl. No.: 12/167,907

(22) Filed: Jul. 3, 2008

(65) Prior Publication Data

US 2009/0016270 A1 Jan. 15, 2009

Related U.S. Application Data

(60) Provisional application No. 60/949,829, filed on Jul. 13, 2007.

(51) Int. Cl.
*H04L 12/28* (2006.01)
(52) U.S. Cl. ...................................... 370/431
(58) Field of Classification Search ............ None
See application file for complete search history.

(56) References Cited

U.S. PATENT DOCUMENTS

| | | | | |
|---|---|---|---|---|
| 6,445,922 B1* | 9/2002 | Hiller et al. | ................... | 455/433 |
| 6,515,974 B1* | 2/2003 | Inoue et al. | ................... | 370/331 |
| 6,571,289 B1 | 5/2003 | Montenegro | | |
| 6,973,057 B1* | 12/2005 | Forslow | ........................ | 370/328 |
| 2002/0191576 A1* | 12/2002 | Inoue et al. | ................... | 370/338 |
| 2003/0193952 A1* | 10/2003 | O'Neill | ......................... | 370/392 |
| 2003/0224788 A1* | 12/2003 | Leung et al. | ............... | 455/435.1 |
| 2006/0034209 A1* | 2/2006 | O'Neill | ......................... | 370/328 |
| 2007/0253371 A1* | 11/2007 | Harper et al. | ................. | 370/331 |
| 2008/0165776 A1* | 7/2008 | Tao et al. | ...................... | 370/392 |
| 2008/0291867 A1* | 11/2008 | Weniger et al. | ............... | 370/328 |
| 2010/0067503 A1* | 3/2010 | Premec | ......................... | 370/338 |

FOREIGN PATENT DOCUMENTS

| | | |
|---|---|---|
| JP | 2003304573 A | 10/2003 |
| JP | 2005252997 A | 9/2005 |

OTHER PUBLICATIONS

International Search Report—PCT/US08/069845—International Search Authority, European Patent Office—Oct. 17, 2008.

(Continued)

*Primary Examiner* — Chi Pham
*Assistant Examiner* — Fan Ng
(74) *Attorney, Agent, or Firm* — Kam T. Tam

(57) ABSTRACT

Systems, methodologies, and devices are described that enable communication devices, such as mobile devices, to efficiently connect and communicate with public data networks (PDNs) even if overlapping Internet protocol address spaces exist in the PDNs. The subject innovation can employ virtual home agents (v-HAs) that can respectively serve PDNs. To facilitate connection of a mobile device to a desired PDN, a message, including an identifier relating to the desired PDN, can be transmitted to a v-HA and it can be discovered whether that v-HA serves the desired PDN; if so, the v-HA transmits the message to a "home" home agent (h-HA) associated with the desired PDN; and if not, the v-HA can transmit a switch message indicating the correct v-HA to which the message should be sent. Concatenation of communication tunnels associated with the correct v-HA and h-HA facilitate efficient communication associated with the mobile device and desired PDN.

47 Claims, 15 Drawing Sheets

OTHER PUBLICATIONS

Written Opinion—PCT/US08/069845—International Search Authority, European Patent Office—Oct. 17, 2008.

Perkins, Charles E., et al., "Private Addresses in Mobile IP; draft-ietf-mobileip-privaddr-oo.txt," IETF STandard-Working-Draft, Internet Engineering Task Force, IETF, CH, vol. mobileip, Jun. 25, 1999.

Leung, G., et al., "WiMAX Forum/3GPP2 Proxy Mobile IPv4; draft-leung-mip4-proxy-mode-03.txt," IETF Standard-Working-Draft, Internet Engineering Task Force, IETF, CH, No. 3, Jul. 3, 2007.

Khalil, Muhanna M., et al., "GRE Key Option for Proxy Mobile IPv6; draft-muhanna-netlmm-grekey-option-00.txt," IETF Standard-Working-Draft, Internet Engineering Task Force, IETF, CH, Apr. 3, 2007.

* cited by examiner

MIP/PMIP CONCATENATION WHEN OVERLAPPING ADDRESS SPACE ARE USED

CROSS-REFERENCE TO RELATED APPLICATIONS

This application claims the benefit of U.S. Provisional Patent application Ser. No. 60/949,829 entitled "METHOD AND APPARATUS FOR MIP/PMIP CONCATENATION WHEN OVERLAPPING ADDRESS SPACE ARE USED" which was filed Jul. 13, 2007, the entirety of the aforementioned application is herein incorporated by reference.

BACKGROUND

I. Field

The following description relates generally to wireless communications, and more particularly to mobile Internet protocol (MIP)/proxy MIP (PMIP) concatenation when overlapping address space are used.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Third Generation Partnership Project (3GPP) Long-Term Evolution (LTE) systems, Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. This communication link can be established via a single-in-single-out, multiple-in-signal-out, or a multiple-in-multiple-out (MIMO) system.

For instance, a MIMO system can employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_S$ independent channels can correspond to a dimension. The MIMO system can provide improved performance (e.g., higher throughput and/or greater reliability) if the additional dimensionalities created by the multiple transmit and receive antennas are utilized.

A MIMO system can support a time division duplex (TDD) and frequency division duplex (FDD) systems. In a TDD system, the forward and reverse link transmissions can be on the same frequency region so that the reciprocity principle allows the estimation of the forward link channel from the reverse link channel. This can enable the access point to extract transmit beamforming gain on the forward link when multiple antennas are available at the access point Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Often, individual networks, such as home networks, corporate networks, or private networks, can have overlapping address spaces. Similar systems that connect communication devices, such as mobile devices, to an Internet network can be faced with the issue that a network to which the system attempts to connect the communication device uses overlapping address spaces.

One technique for enabling connection of communication devices where a network uses overlapping address spaces, such as when a public data network gateway (PGW) is to serve multiple public data networks (PDNs), is to employ policy routing where a unique tunnel end point identifier (TE ID) can be used for each communication device to facilitate data transmissions between the source and destination. For uplink transmission, a TE ID associated with a communication device can be mapped to a desired outgoing tunnel to a desired PDN. For downlink transmission, the destination address (e.g., destination Internet protocol (IP) address) of a data packet on a per PDN (incoming tunnel) basis can be mapped to a given TE ID.

For example, a first mobile device can be associated with a first address space, a second mobile device can be associated with a second address space, and a third mobile device can be associated with an address space that overlaps the first address space. Each mobile device can be associated with a respective TE ID, and all of these mobile devices can be connected to a base station. The base station can be connected to a signaling gateway (SGW). The base station and SGW can utilize the TE IDs to facilitate switching related to the mobile devices. The SGW can be connected to a PGW that can employ policy routing to route data packets to desired PDNs based on the respective TE IDs, destination address, and PDN associated with respective data packets. Essentially tunnels (e.g., IP/IP security (IPSEC) tunnels) can be formed, where the routing of a data packet to a given tunnel and PDN associated therewith can be based in part on the TE ID associated with the data packet. For instance, using the TE IDs, data packets associated with the first mobile device can be routed to a first tunnel and to a first PDN associated therewith, data packets associated with the second mobile device can be routed to a second tunnel and a second PDN associated therewith, and data packets associated with the third mobile device can be routed to the second tunnel and associated second PDN. As a result, the issue of overlapping address spaces with regard to the first mobile device and third mobile device is resolved, as data packets respectively associated with the first mobile device and third mobile device are routed through separate tunnels and separate PDNs.

However, techniques that employ unique identifiers, such as TE IDs, to identify mobile communication devices to facilitate routing data associated with the communication devices in networks having overlapping address space can utilize significant memory resources as the unique identifiers of each communication device have to be stored in memory. It is desirable to efficiently establish a communication connection and route data in a network from source to destination particularly when there are overlapping address spaces. It is also desirable to efficiently use resources, such as memory resources, when establishing communication connections and routing data in the network.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating efficient connection and communication associated with a communication device (e.g., mobile device) within a network in a wireless communication environment by employing a virtual home agent (v-HA), a "home" home agent (h-HA), and concatenation of communication tunnels associated with the v-HA and/or h-HA to facilitate connection and communication between a communication device and a desired public data network (PDN). In one aspect, systems, methodologies, and devices are described that enable communication devices, such as mobile devices, to efficiently connect and communicate with PDNs even if overlapping Internet protocol address spaces exist in the PDNs. The subject innovation can employ v-HAs that can respectively serve PDNs, such that one v-HA can be employed for each PDN served. To facilitate connection of a communication device to a desired PDN, a message (e.g., proxy binding update (PBU), binding update (BU)), which can include an identifier relating to the desired PDN (e.g., network access identifier), can be transmitted to a v-HA and it can be discovered whether that v-HA serves the desired PDN.

In one aspect, if the instant v-HA determines that it serves the desired PDN, a communication tunnel can be created between a mobile access gateway (MAG) associated with the communication device and the v-HA. Also, the v-HA can transmit the message to a h-HA connected with the desired PDN to facilitate connecting the h-HA to the v-HA, where a tunnel can be created between the v-HA and h-HA. The tunnels can be mapped to each other and concatenated to facilitate communication flow through the tunnels to facilitate communication between the communication device and desired PDN. If the instant v-HA is determined to not be the v-HA that serves the desired PDN, that v-HA can transmit a HA-switch message indicating that it is not the correct-v-HA and/or identifying the correct v-HA to which the message should be sent. The message can be redirected to the correct v-HA, which can transmit the message to the desired h-HA to facilitate creating of (and concatenation of) communication tunnels between the MAG, v-HA, and h-HA to facilitate connection and communication between the communication device and the desired PDN.

According to related aspects, a method that facilitates communication associated with a mobile device is described herein. The method can include determining a virtual home agent that serves a specified public data network based at least in part on predefined virtual home agent-to-public data network mapping. Further, the method can comprise transmitting a message, comprising information identifying the specified public data network, from the virtual home agent to a home home-agent discovered to be associated with the specified public data network to facilitate connecting the mobile device to the specified public data network at a predefined Internet protocol (IP) space, the mobile device is connected to the specified public data network via a first tunnel created between a first mobile access gateway and the virtual home agent that serves the specified public data network and a second tunnel created between a second mobile access gateway associated with the virtual home agent and the home home-agent, the first tunnel is based on at least one of a client mobile Internet protocol (CMIP) or a proxy mobile Internet protocol (PMIP) and the second tunnel is based on a proxy mobile Internet protocol (PMIP).

Another aspect relates to a communications apparatus. The communications apparatus can include a memory that retains instructions related to transmission of a message, comprising information identifying a specified public data network, from a virtual home agent, which serves the specified public data network, to a home home-agent determined to be associated with the specified public data network to facilitate connecting a mobile device to the specified public data network at a predefined Internet protocol (IP) space, the virtual home agent that serves a specified public data network is determined based at least in part on predefined virtual home agent-to-public data network mapping. Further, the communications apparatus can include a processor, coupled to the memory, configured to execute the instructions retained in the memory.

Yet another aspect relates to a communications apparatus that facilitates communication associated with a mobile device. The communications apparatus can include means for determining a virtual home agent that serves a specified public data network based at least in part on predefined virtual home agent-to-public data network mapping. Further, the communications apparatus can comprise means for transmitting a message, comprising information identifying the specified public data network, from the virtual home agent to a home home-agent discovered to be associated with the specified public data network to facilitate connecting the mobile device to the specified public data network at a predefined Internet protocol (IP) space, the mobile device is connected to the specified public data network via a first tunnel created between a first mobile access gateway and the virtual home agent that serves the specified public data network and a second tunnel created between a second mobile access gateway associated with the virtual home agent and the home home-agent, the first tunnel is based on at least one of a client mobile Internet protocol (CMIP) or a proxy mobile Internet protocol (PMIP) and the second tunnel is based on a proxy mobile Internet protocol (PMIP).

Still another aspect relates to a computer program product, comprising: a computer-readable medium comprising code for: identifying a virtual home agent that serves a specified public data network based at least in part on predefined virtual home agent-to-public data network mapping; and transmitting a message, comprising information identifying the specified public data network, from the virtual home agent to a home home-agent determined to be associated with the specified public data network to facilitate connecting a mobile device to the specified public data network at a predefined Internet protocol (IP) space.

In accordance with another aspect, an apparatus in a wireless communication system can include a processor, wherein the processor can be configured to determine a virtual home agent that serves a specified public data network based at least in part on predefined virtual home agent-to-public data network mapping. Moreover, the processor can be configured to transmit a message, comprising information identifying the specified public data network, from the virtual home agent to a home home-agent discovered to be associated with the specified public data network to facilitate creation of a concatenated set of tunnels utilized to connect a mobile device to the specified public data network at a predefined Internet protocol (IP) space.

According to other aspects, a method that facilitates communication associated with a mobile device is described herein. The method can include transmitting a message comprising information that facilitates identifying a public data network with which the mobile device seeks to connect, to a first virtual home agent to facilitate determining if the first virtual home agent is a virtual home agent that serves the public data network. Further, the method can comprise redirecting the message to transmit the message to another virtual home agent based at least in part on a received home agent switch message that at least one of indicates the first virtual home agent does not serve the public data network or identifies another virtual home agent that serves the public data network if it is determined that the first virtual home agent does not serve the public data network, to facilitate creation of a concatenated set of tunnels that facilitate connecting the mobile device to the public data network, wherein the concatenated set of tunnels comprising a first tunnel created between a first mobile access gateway and the virtual home agent that serves the specified public data network and a second tunnel created between a second mobile access gateway associated with the virtual home agent and a home home-agent associated with the public data network, the first tunnel is based on at least one of a client mobile Internet protocol (CMIP) or a proxy mobile Internet protocol (PMIP) and the second tunnel is based on a proxy mobile Internet protocol (PMIP).

Yet another aspect relates to a wireless communications apparatus that can include a memory that retains instructions related to communication of a message comprising information that facilitates identifying a public data network to which a mobile device seeks to connect, to a first virtual home agent to facilitate determination of whether the first virtual home agent is a virtual home agent that serves the public data network, and redirection of the message to communicate the message to another virtual home agent based at least in part on a received home agent switch message that at least one of indicates the first virtual home agent does not serve the public data network or identifies another virtual home agent that serves the public data network if it is determined that the first virtual home agent does not serve the public data network, to facilitate creation of a concatenated set of tunnels that facilitate connection of the mobile device to the public data network. Further, the wireless communications apparatus can comprise a processor, coupled to the memory, configured to execute the instructions retained in the memory.

Another aspect relates to a communications apparatus that facilitates communication associated with a mobile device. The communications apparatus can include means for transmitting a message comprising information that facilitates identifying a public data network with which the mobile device seeks to connect, to a first virtual home agent to facilitate determining if the first virtual home agent is a virtual home agent that serves the public data network. Further, the communications apparatus can include means for redirecting the message to transmit the message to another virtual home agent based at least in part on a received home agent switch message that at least one of indicates the first virtual home agent does not serve the public data network or identifies another virtual home agent that serves the public data network if it is determined that the first virtual home agent does not serve the public data network, to facilitate creation of a concatenated set of tunnels that facilitate connecting the mobile device to the public data network.

Still another aspect relates to a computer program product, comprising: a computer-readable medium comprising code for: communicating a message comprising information related to a public data network to which a mobile device seeks to connect, to a first virtual home agent to facilitate determining whether the first virtual home agent is a virtual home agent that serves the public data network, and redirecting the message to communicate the message to another virtual home agent based at least in part on a received home agent switch message that at least one of indicates the first virtual home agent does not serve the public data network or identifies another virtual home agent that serves the public data network if it is determined that the first virtual home agent does not serve the public data network, to facilitate creating a linked set of tunnels that facilitate connection of the mobile device to the public data network.

In accordance with another aspect, an apparatus in a wireless communication system can include a processor, wherein the processor can be configured to transmit a message comprising information that facilitates identifying a public data network with which the mobile device seeks to connect, to a first virtual home agent to facilitate determining if the first virtual home agent is a virtual home agent that serves the public data network. Further, the processor can be configured to re-transmit the message to another virtual home agent based at least in part on a received home agent switch message that at least one of indicates the first virtual home agent does not serve the public data network or identifies another virtual home agent that serves the public data network if it is determined that the first virtual home agent does not serve the public data network, to facilitate creation of a concatenated set of tunnels that facilitate connecting the mobile device to the public data network.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
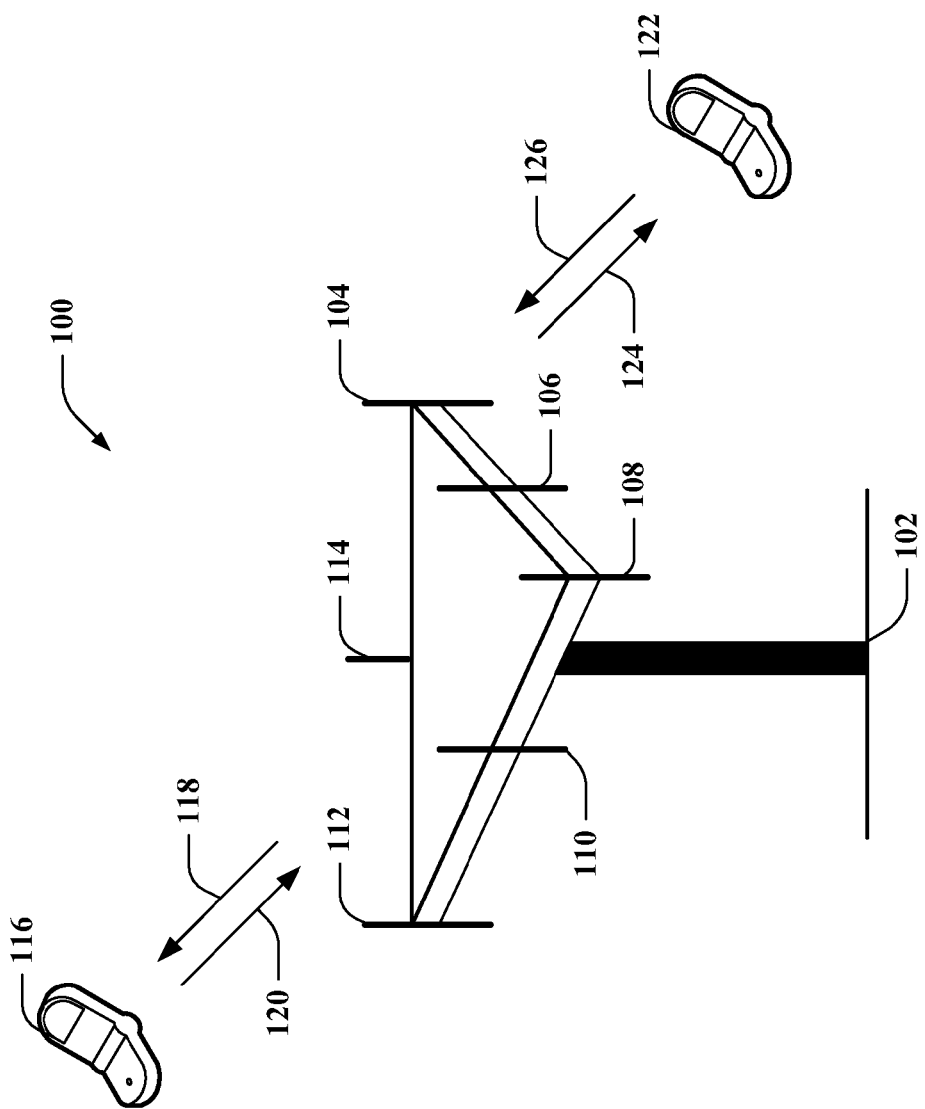
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," "home agent," "virtual home agent (v-HA)," "'home' home agent (h-HA)," "mobile access gateway (MAG)," "selector," "evaluator," "communicator," "mapper," "identifier," C-MAG," "data store," and the like can refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMÓ, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). These various radio technologies and standards are known in the art.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B (e.g., evolved Node B, eNode B, eNB), or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. It is to be appreciated that, while one base station 102 is depicted in FIG. 1, the disclosed subject matter can comprise more than one base station in the network, such as, for example, a serving base station 102 and one or more neighbor base stations 102.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 (e.g., downlink (DL)) and receive information from mobile device 116 over a reverse link 120 (e.g., uplink (UL)). Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices (e.g., 116) in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

In accordance with an aspect, one or more mobile devices (e.g., 116, 122) can be communicatively connected with a base station 102 in a core network. A mobile device(s) 116 can be connected to a desired public data network (PDN) (e.g., Internet network) via a gateway (e.g., mobile access gateway (MAG)) that can be associated (e.g., connected) with the core network. At times, disparate PDNs may have overlapping address spaces, where, for example, a first PDN is using an Internet protocol (IP) address space of 10.0.01 and a second PDN is also using an IP address space of 1100.0.1. In one aspect, the subject innovation can facilitate connecting mobile devices to desired disparate PDNs, even if disparate PDNs have overlapping address spaces, by employing concatenated tunnels, where, for example, a first tunnel can be utilized to connect the gateway to a desired virtual home agent (e.g., signaling gateway (SGW)) and a second tunnel can be utilized to connect the v-HA (e.g., MAG associated with the v-HA) to a "home" home agent (h-HA) (e.g., public data network gate way (PDNGW or PGW)) that can be associated with the desired PDN to facilitate connecting the mobile device to the desired PDN. The first tunnel can be mapped to the second tunnel to facilitate concatenating (e.g., linking) the first and second tunnel to form a concatenated set of tunnels.

In another aspect, the concatenated tunneling can be concatenated proxy mobile Internet protocol (MPIP)-MPIP or concatenated client mobile Internet protocol (CMIP)-PMIP. The subject innovation can employ one or more v-HAs and a h-HA, where a different physical or virtual h-HA (e.g., PDNGW) can be used for each PDN served and a different physical or virtual v-HA (e.g., SGW) can be used for each PDN served. The v-HA(s) can facilitate policy routing by mapping incoming tunnels to respective outgoing tunnels on a per PDN basis. The h-HA can facilitate policy routing based at least in part on tunnel destination addresses respectively associated with the PDNs.

Figure 2A:
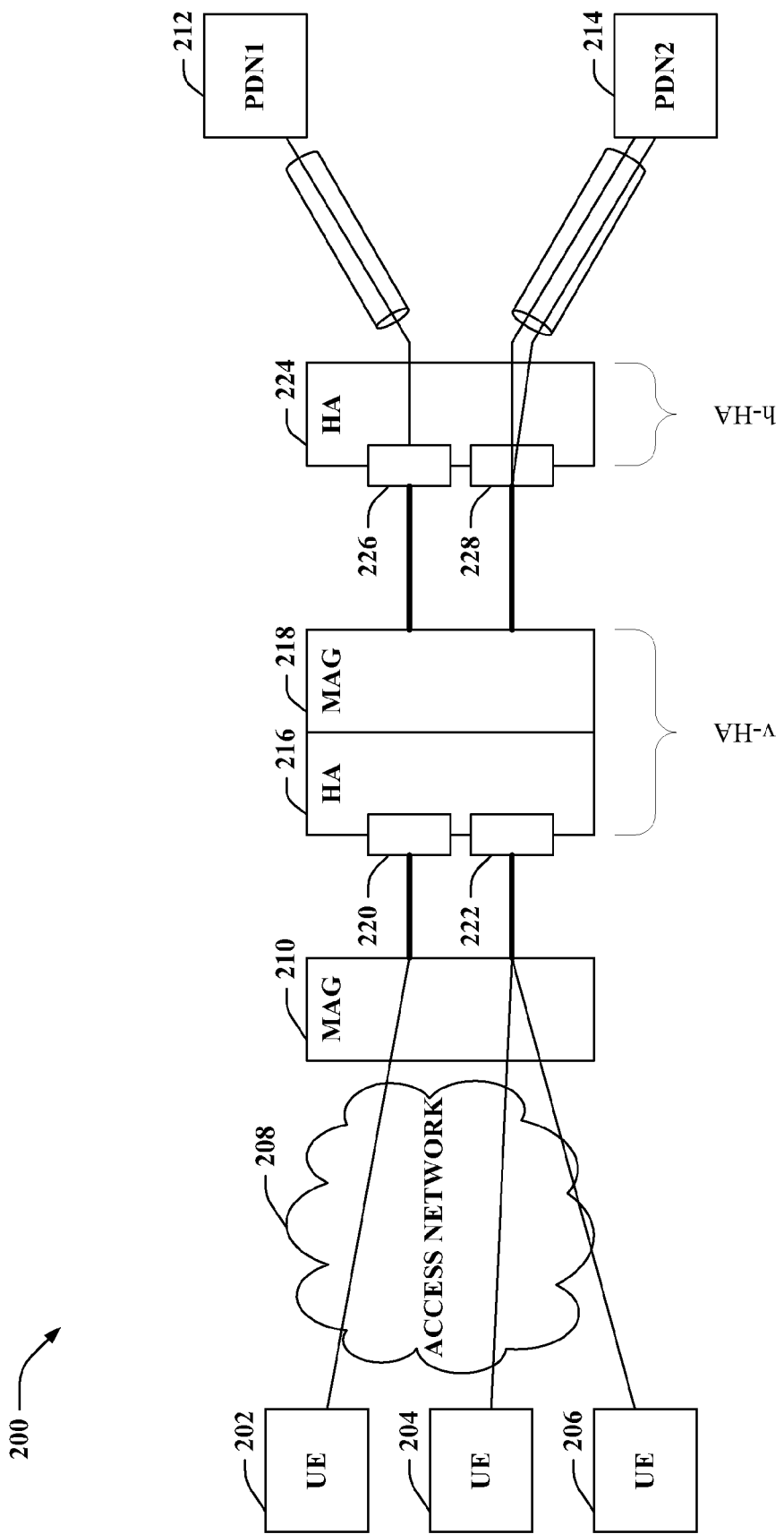
FIG. 2A is an illustration of an example a system that can facilitate connection and communication between a communication device and a desired public data network (PDN) in accordance with an embodiment of the disclosed subject matter.

Turning to FIG. 2A, illustrated is a system 200 that can facilitate connection and communication between a communication device and a desired PDN in accordance with an embodiment of the disclosed subject matter. System 200 can include one or more mobile devices (e.g., three mobile devices, mobile device 202, mobile device 204, and mobile device 206, are illustrated, however, the subject innovation also can have less than three mobile devices or more than three mobile devices). Each mobile device 202, 204, 206 can be communicatively connected to a base station(s) 102 (not shown in FIG. 2A, however, the base station 102 and core network associated therewith can be part of the access network 208) in a wireless communication environment. It is to be appreciated that each mobile device 202, 204, 206 can be the same or similar as, and/or can have the same or similar functionality as, respective mobile devices (e.g., mobile device 116, mobile device 122) as more fully described herein, for example, with regard to system 100.

As desired, the mobile devices 202, 204, 206 each can be connected via the access network 208 to a MAG 210 that can be utilized to facilitate connecting the mobile devices 202, 204, 206 to a desired PDN, such as PDN1 212 or PDN2 214 (while only two PDNs are illustrated, it is to be appreciated that the subject innovation is not so limited as there also can be less than two PDNs or more than two PDNs employed in accordance with the disclosed subject matter). The MAG 210 can communicate with one or more HAs 216 (e.g., local mobility anchor (LMA)/HA), and each HA 216 can be respectively associated (e.g., connected) with a MAG 218, where a v-HA, comprising a HA 216 and MAG 218, can be utilized as a signaling gateway to facilitate connecting an associated mobile device (e.g., 202) to a desired PDN (e.g., PDN1 212). The HA 216 can comprise one or more v-HAs, such as v-HA 220 and/or v-HA 222, that can be utilized to facilitate connecting mobile devices (e.g., 202, 204, 206) respectively associated therewith to desired PDNs (e.g., PDN1 212, PDN2 214). In accordance with various embodiments, the one or more v-HAs (e.g., 220, 222) can be a 3GPP Service Gateway (SGW), a non-3GPP Access Gateway (AGW), or a visited Packet Data Network Gateway (PD-NGW, a.k.a. PGW).

System 200 also can include a HA 224 (e.g., h-HA), which can be a PDNGW, for example, that can comprise one or more v-HAs, such as v-HA 226 and/or v-HA 228, and can be utilized to facilitate connecting mobile devices (e.g., 202) to desired PDNs (e.g., PDN1 212). In one aspect, one or more mobile devices, such as mobile device 202, mobile device 204, and/or mobile device 206, can be connected to MAG 210 via the access network 208 (e.g., mobile device wirelessly connected to a base station that is connected to a core network, which can be connected to MAG 210). MAG 210 can facilitate discovering the desired v-HA (e.g., 220, 222) to which a particular mobile device is to be connected. The MAG 210 and desired v-HA(s) can facilitate establishing a tunnel between the MAG 210 and a desired v-HA(s) (e.g., 220, 222), where there can be one v-HA in HA 216 for each PDN (e.g., PDN1 212, PDN2 214) to be served by HA 216. It is to be appreciated and understood that there also can be more than one HA 216 (as well as MAG 218, v-HA 220, and v-HA 222) that can be utilized to serve PDNs respectively associated therewith.

For instance, in accordance with an embodiment, when a new mobile device (e.g., mobile device 202) enters the access network 208 and desires to connect to a particular PDN (e.g., PDN1 212), MAG 210 can allocate a local anchor, and can transmit a proxy binding update (PBU), which can include a network access identifier (NAI) associated with the new mobile device, to a v-HA (e.g., HA 216 and MAG 218 combination), where the MAG 210 can select the v-HA from a pool of identified v-HAs whose respective addresses can be stored in a database that can be accessed by the MAG 210. The v-HA (e.g., HA 216 and MAG 218 combination) can receive the PBU and can analyze the PBU information, such as the NAI, and can access information regarding the PDNs (e.g., predefined v-HA to PDN mapping) from a database to determine whether that v-HA is the v-HA that is to be utilized for the PDN to which connection is desired by the new mobile device (e.g., an IP address or a fully qualified domain name (FQDN) can be obtained to facilitate determining whether the v-HA address is a correct address through which to connect to the desired PDN, or whether the proper v-HA is at another address). If that v-HA (e.g., HA 216 and MAG 218 combination) is the proper v-HA to facilitate connection to the desired PDN, a tunnel can be created between MAG 210 and a v-HA (e.g., 220) of HA 216. MAG 218 can facilitate transmitting a PBU to HA 224 (e.g., h-HA) and a tunnel can be created between MAG 218 and a desired v-HA (e.g., 226) of HA 224, where the desired v-HA (e.g., 226) can be respectively associated with the desired PDN (e.g., PDN1 212). In one aspect, the HA 224 can comprise a PDNGW (a.k.a. PGW). A mapping can be created between the first tunnel (e.g., tunnel between MAG 210 and v-HA 220) and the second tunnel (e.g., tunnel between MAG 218 and v-HA 226) to facilitate concatenating the two tunnels and connecting the mobile device to the desired PDN.

If the v-HA (e.g., HA 216 and MAG 218 combination) is not the proper v-HA to be used to connect the new mobile device with the desired PDN, the v-HA can access information from a database that can indicate which v-HA is the proper v-HA, and can transmit a HA-switch message to the MAG 210, where the HA-switch message can include information regarding the v-HA that can be used for the desired PDN, which can be discovered by the HA 216. MAG 210 can receive the HA-switch message and can transmit a PBU, which can include the NAI associated with the new mobile device, to the proper v-HA (e.g., comprising HA and MAG combination) as indicated by the HA-switch message. The MAG 210 can establish a tunnel between the MAG 210 and v-HA (e.g., 220) of the proper HA 216, and the proper MAG 218 can facilitate transmitting a PBU, which can include the NAI associated with the new mobile device, to the desired HA 224 (e.g., h-HA, such as a "home" evolved packet service home agent (h-EPSHA))). A tunnel can be created between MAG 218 and the desired v-HA (e.g., 226) associated with the desired PDN (e.g., PDN1 212).

For example, there can be three mobile devices 202, 204, 206 that can be connected to an access network 208, where mobile device 202 desires to connect to PDN1 212 and mobile devices 204 and 206 each desired to connect to PDN2 214. The first mobile device 202 can desire to connect to PDN1 212 using an IP address 10.0.0.1; the second mobile device 204 can desire to connect to PDN2 214 using an IP address 10.0.0.2; and the third mobile device 206 can desire to connect to PDN2 214 using an IP address 10.0.0.1. As can be seen, the first mobile device 202 and the third mobile device 206 are using IP addresses that are overlapping, as the first and third mobile devices are each using 10.0.0.1 as an IP address to connect to respective PDNs, PDN1 212 and PDN2 214, that are using overlapping IP addresses. System 200 can facilitate connecting each of the mobile devices 202, 204, 206 to the desired PDNs, even though there are overlapping address spaces.

Employing the discovery process to determine which v-HA is the proper v-HA for each of the PDNs being served, the MAG 210 can facilitate creating a first tunnel between the MAG 210 and v-HA 220 (e.g., discovered to be a proper v-HA) and the mobile device 202 can be connected with the first tunnel at the MAG 210. The MAG 218 also can facilitate creating a second tunnel between the MAG 218 and v-HA 226 of HA 224, where the tunnel connected to v-HA 220 can be mapped to the tunnel between MAG 218 and v-HA 226 to facilitate concatenating the two tunnels. The v-HA 226 can be connected to PDN1 212, and the mobile device 202 can thereby be connected to PDN1 212. The MAG 210 also can facilitate creating another first tunnel between the MAG 210 and v-HA 222 and mobile devices 204 and 206 can both be connected to the other first tunnel at the MAG 210 since mobile devices 204 and 206 desire to be connected to the same PDN, PDN2 214. MAG 218 can facilitate creating another second tunnel between MAG 218 and v-HA 228 of HA 224, where the tunnel connected to v-HA 222 can be mapped to the tunnel between MAG 218 and v-HA 228 to facilitate concatenating these two other tunnels. The v-HA 228 can be connected to PDN2 214, and mobile devices 204 and 206 can thereby be connected to PDN2 214. Since mobile devices 204 and 206 are connected to the same PDN, by definition the mobile devices 204 and 206 are connecting via different IP addresses and thus there will be no overlapping of addresses, even though these two mobile devices 204 and 206 are being connected to the same PDN2 214 via the same concatenated set of tunnels.

In accordance with an embodiment, virtual HA selection can be facilitated, where each PDN can be associated with a disparate v-HA (e.g., virtual evolved packet service home agent (v-EPSHA)). For instance, if a mobile device (e.g., 202) desires to connect to PDN1 (e.g., 212), MAG 210 can transmit a binding update (BU) to a first v-HA, and information in the BU and information regarding which v-HAs are associated with which PDNs (e.g., predefined v-HA to PDN mapping) can be accessed from a database and can be evaluated by the first v-HA to determine whether the first v-HA is the desired v-HA to connect the mobile device to PDN1. The first v-HA can determine that it is the proper v-HA, and a tunnel between MAG 210 and the first v-HA can be facilitated. The first v-HA also can discover the upstream h-HA from information in the database and MAG 218 can transmit a BU to the h-HA, and a tunnel can be created between MAG 218 and the desired h-HA, which can be connected with the desired PDN1. There can be a mapping to facilitate linking these two tunnels to facilitate the communication flow between the mobile device and the desired PDN1.

A second mobile device (e.g., 204) can desire to connect to PDN2. MAG 210 can transmit a binding update (BU) to a first v-HA, and information in the BU and a predefined v-HA to PDN mapping can be accessed from a database and can be evaluated by the first v-HA to determine whether the first v-HA is the desired v-HA to connect the mobile device to PDN1. If the first v-HA does not serve the desired PDN, the first v-HA can determine that it is not the proper v-HA and also can determine that a second v-HA is the proper v-HA based at least in part on the predefined v-HA to PDN mapping to facilitate connecting the second mobile device to PDN2. The first v-HA can transmit a HA-switch message indicating that the second v-HA is the proper v-HA to the MAG 210, and the MAG 210 can transmit a BU to the second v-HA. A tunnel between MAG 210 and the second v-HA can be created. The second v-HA can discover the upstream h-HA from information in the database and MAG 218 can transmit a BU to the desired h-HA, and a tunnel can be created between MAG 218 and the desired h-HA, which can be connected with the desired PDN2. There can be a mapping to facilitate linking these two tunnels to facilitate the communication flow between the mobile device and the desired PDN2.

A third mobile device (e.g., 206) can desire to connect to PDN3. MAG 210 can transmit a binding update (BU) to a first v-HA, and information in the BU and the predefined v-HA to PDN mapping can be accessed from a database and can be evaluated by the first v-HA to determine whether the first v-HA is the desired v-HA to connect the mobile device to PDN1. If the first v-HA determines that it is not the v-HA that serves PDN3, the first v-HA can determine that it is not the proper v-HA and also can determine that a third v-HA is the proper v-HA to facilitate connecting the second mobile device to PDN2. The first v-HA can transmit a HA-switch message indicating that the third v-HA is the proper v-HA to the MAG 210, and the MAG 210 can transmit a BU to the third v-HA. A tunnel between MAG 210 and the third v-HA can be created. The third v-HA can discover the upstream h-HA from information in the database and MAG 218 can transmit a BU to the desired h-HA, and a tunnel can be created between MAG 218 and the desired h-HA, which can be connected with the desired PDN3. There can be a mapping to facilitate linking these two tunnels to facilitate the communication flow between the mobile device and the desired PDN3.

In accordance with another embodiment, there can be a "master" v-HA, where the "master" v-HA can include code and/or a database that can contain information relating to the relationships between v-HAs and PDNs in order to facilitate determining the proper v-HA to be employed with regard to a particular PDN. To facilitate connecting a mobile device to a desired PD, the MAG 210 can communicate a BU to the "master" v-HA so the proper v-HA can be determined by the "master" v-HA.

In accordance with still another embodiment, there can be an external database that can contain information relating to the relationships between v-HAs and PDNs. Each v-HA can comprise code, and each v-HA can access the external database to retrieve information regarding v-HA to PDN relationships, to facilitate determining the proper v-HA to use to connect a mobile device to a desired PDN.

It is to be further appreciated and understood that the subject innovation can employ virtually any desired protocol (e.g., Internet protocol (IP)) to facilitate communications associated with a mobile device. For example, the subject innovation can employ IPv4 and/or IPv6 (e.g., messaging in accordance with IPv4 and/or IPv6) to facilitate communication associated with a mobile device.

The subject innovation can facilitate efficient connection and communication between mobile devices and PDNs as compared to conventional systems, devices, and methods. For example, memory can be more efficiently utilized (e.g., amount of memory used can be reduced) as the subject innovation can be utilized by storing information that facilitates identifying PDNs to be served in the communication environment. The subject innovation does not have to store identification information for each mobile device that desires to connect or is associated with the PDNs or the communication environment. Typically, there are many magnitudes more mobile devices than PDNs in a communication environment, and thus tracking and storing the identification information related to PDNs can utilize significantly less memory resources and other resources as compared to tracking and storing the identification information (e.g., tunnel end point identifiers (TE IDs)) of mobile devices.

Figure 2B:
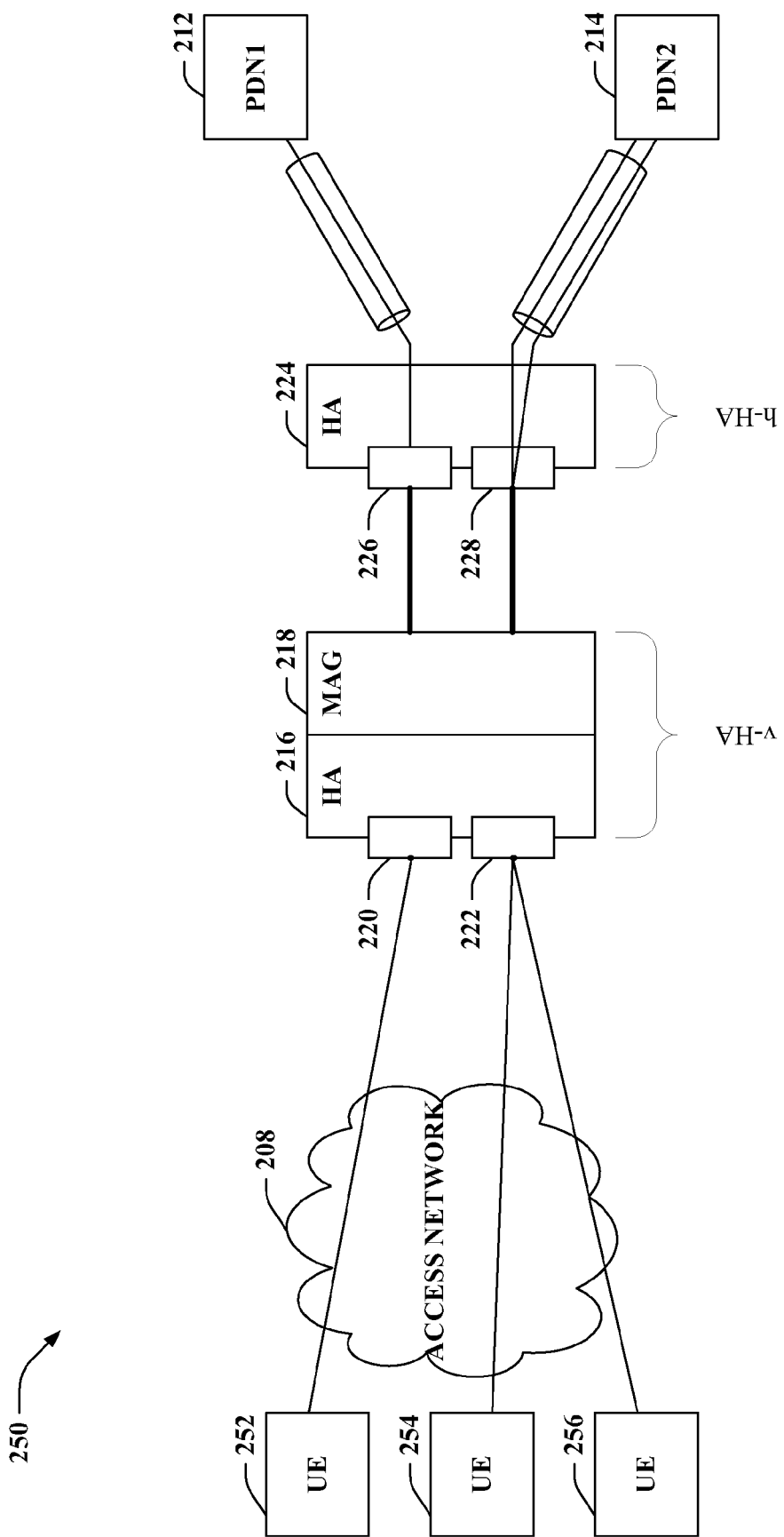
FIG. 2B is an illustration of an example a system that can employ CMIP to facilitate connection and communication between a communication device and a desired public data network (PDN) in accordance with another embodiment of the disclosed subject matter.

Referring to FIG. 2B, illustrated is a system 250 that can employ CMIP to facilitate connection and communication between a communication device and a desired PDN in accordance with another embodiment of the disclosed subject matter. System 250 can include one or more mobile devices (e.g., three mobile devices, mobile device 252, mobile device 254, and mobile device 256, are illustrated, however, the subject innovation also can have less than three mobile devices or more than three mobile devices). Each mobile device 252, 254, 256 can be communicatively connected to a base station(s) 102 (not shown in FIG. 2B, however, the base station 102 and core network associated therewith can be part of the access network 208) in a wireless communication environment. It is to be appreciated that each mobile device 252, 254, 256 can comprise the same or similar functionality as, respective mobile devices (e.g., mobile device 116, mobile device 202) as more fully described herein, for example, with regard to system 100 and system 200.

Figure 10:
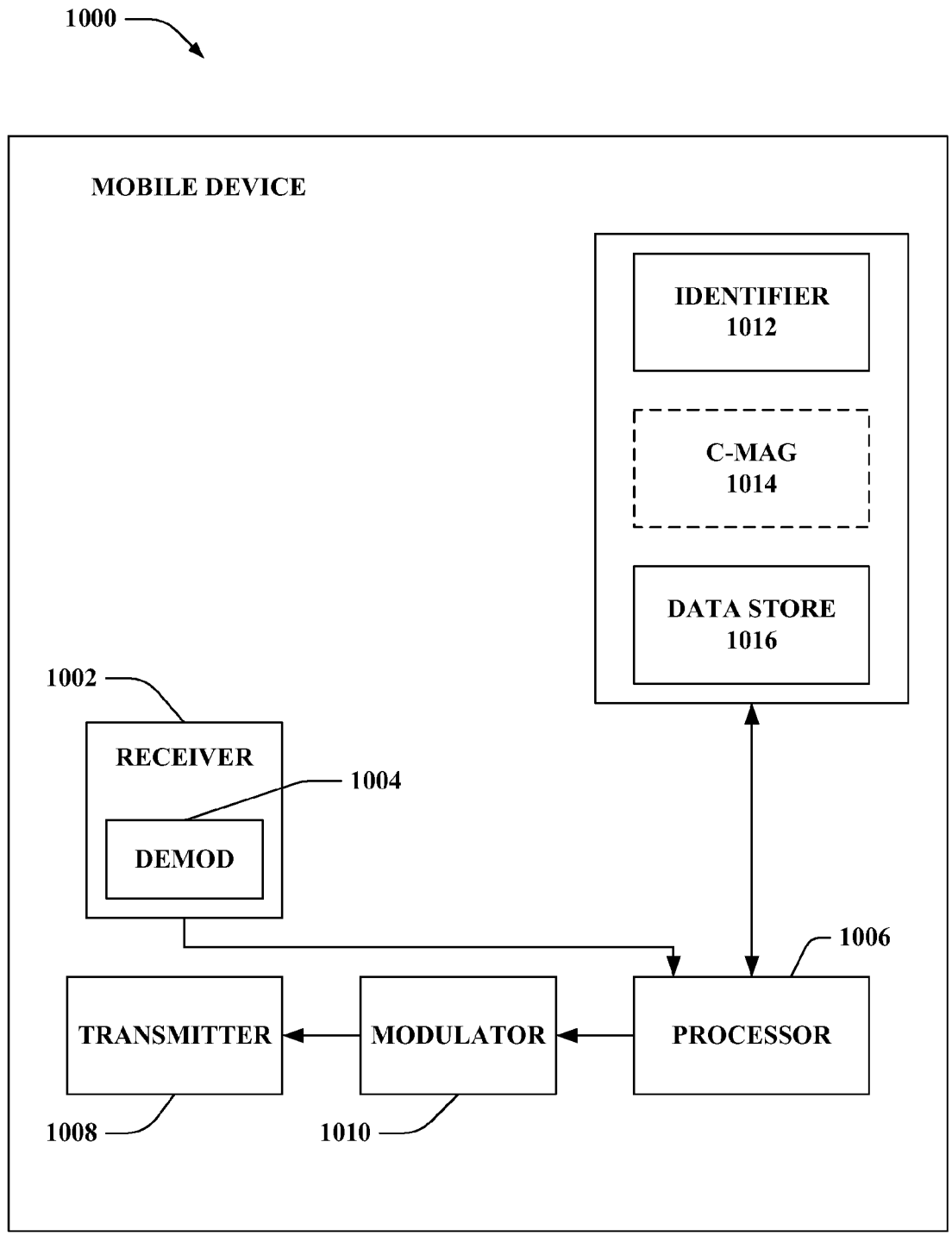
FIG. 10 is an illustration of an example mobile device that can facilitate communications associated with a mobile device in a wireless communication system in accordance with an aspect of the disclosed subject matter.

In accordance with an aspect, one or more mobile devices (e.g., 252) can include a client-based MIP (e.g., CMIP, such as can be employed by an optional C-MAG, as described herein with regard to FIG. 10), where the mobile device 252 comprising client-based MIP functionality (e.g., employing MIPv6 protocol or variant thereof) can facilitate establishing connectivity with a desired v-HA (e.g., 220) that serves a desired PDN (e.g., PDN1 212). The mobile device 252 can transmit a message (e.g., BU with NAI) to a selected v-HA (e.g., 220) to facilitate determining the v-HA that can serve a desired PDN in order to facilitate connecting and communicating with the desired PDN. The selected v-HA can communicate with the mobile device 252 to provide information relating to whether the selected v-HA is the v-HA that serves the desired PDN.

For example, if the selected v-HA does not serve the desired PDN, the selected v-HA can retrieve information from a database to determine which v-HA does serve the desired PDN. In such instance, the selected v-HA can transmit a HA-switch message to the mobile device 252, where the HA-switch message can indicate to the mobile device 252 that the selected v-HA is not the desired v-HA and/or can provide the mobile device 252 with information (e.g., v-HA identification, v-HA address) that can facilitate enabling the mobile device 252 to connect to the desired v-HA that serves the desired PDN. The mobile device 252 can transmit a message (e.g., BU with NAI) to the v-HA indicated in the HA-switch message. Thus, when CMIP is employed, it is not necessary to utilize a MAG, such as MAG 210 (e.g., as depicted in FIG. 2A). A mobile device 252 can facilitate connecting to a desired v-HA (e.g., 220) via a base station 102 and core network (e.g., associated with access network 208), where the v-HA (e.g., 220) can facilitate creating a tunnel between MAG 218 and a desired h-HA (e.g., 224) and associated v-HA (e.g., 226) to facilitate connecting the mobile device 252 to a desired PDN (e.g., PDN1 212).

Figure 3:
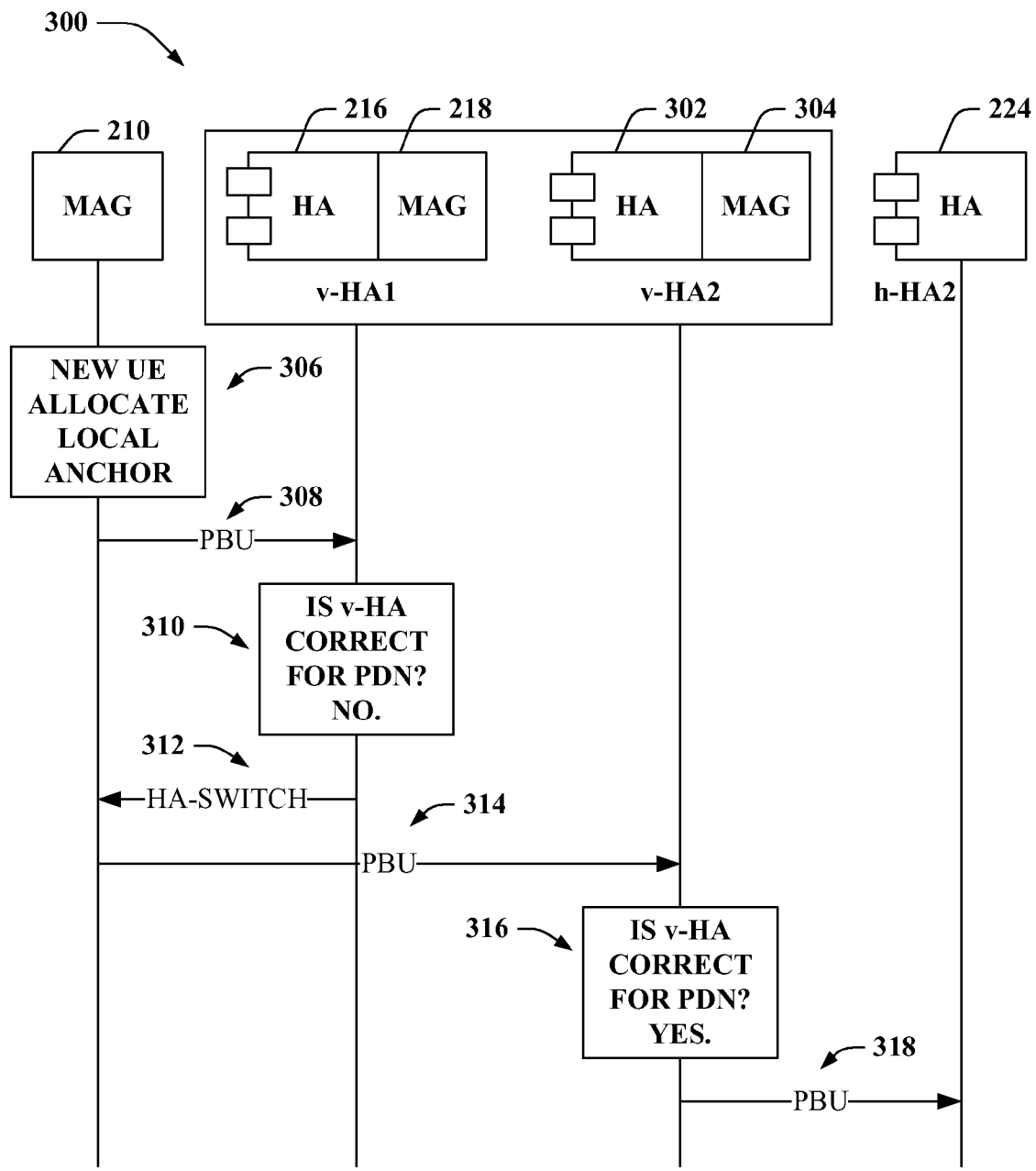
FIG. 3 is a depiction of an example diagram of message flow related to HA-switching to facilitate connection a mobile device to a desired PDN in accordance with an aspect of the disclosed subject matter.

Referring to FIG. 3, depicted is a diagram 300 of the message flow related to HA-switching to facilitate connection a mobile device to a desired PDN in accordance with an aspect of the disclosed subject matter. Included in diagram 300 in FIG. 3 is a MAG 210, HA 216, MAG 218 (e.g., the combination of which can comprise a first v-HA), and h-HA 224, each of which can be the same or similar as, and/or can contain the same or similar functionality as, respective components, such as more fully described herein, for example, with regard to system 100 and/or system 200. Diagram 300 also can include another HA 302 and another MAG 304, where for example, the combination of HA 302 and MAG 304 can comprise a second v-HA. HA 302 can comprise the same or similar functionality as HA 216, and MAG 304 can comprise the same or similar functionality as MAG 218.

In one aspect, when a new mobile device (e.g., 204) enters the network and/or desires to connect to a particular PDN, the MAG 210 can allocate a local anchor (306). The MAG 210 can select a v-HA, such as the first v-HA, from a pool of v-HA addresses that can be listed in a database that can be accessed by the MAG 210. The MAG 210 can transmit a PBU, which can include the NAI of the mobile device, to the selected v-HA, the first v-HA, where HA 216 can receive the PBU (308). HA 216 can access information regarding relationships between the v-HAs and the PDNs, and can analyze the predefined v-HA to PDN mapping (e.g., v-HA to PDN relationship information) and the NAI to facilitate discovering the proper v-HA to be employed to facilitate connecting the mobile device to the desired PDN (310). If the first v-HA is not the proper v-HA, HA 216 can discover which v-HA is the proper v-HA (e.g., second v-HA, as depicted) based at least in part on the predefined v-HA to PDN mapping to facilitate connecting the mobile device to the desired PDN (and h-HA); and HA 216 can transmit a HA-switch message to the MAG 210, where the HA-switch message can indicate that the first v-HA is not the proper v-HA and/or that the proper v-HA is a second v-HA (e.g., comprising HA 302 and MAG 304) (312). The MAG 210 can transmit a PBU, which can include the NAI of the mobile device, to the proper v-HA, the second v-HA, where HA 302 can receive the PBU (314). The HA 302 can access information such as the predefined v-HA to PDN mapping, and can analyze the predefined v-HA to PDN mapping and the NAI to facilitate discovering whether the second v-HA is the proper v-HA to be employed to facilitate connecting the mobile device to the desired PDN (316). If and when the HA 302 determines that the second v-HA is the proper v-HA, the HA 302 can facilitate discovering the h-HA. The MAG 304 can transmit a PBU, which can include the NAI of the mobile device, to the proper h-HA (318). The h-HA can analyze the NAI and can determine the desired PDN to which the mobile device can be connected, and connection of the mobile device to the desired PDN can be facilitated (e.g., tunnel created between MAG 210 and the second v-HA, and second tunnel created between second v-HA and h-HA, where the two tunnels are concatenated).

Figure 4:
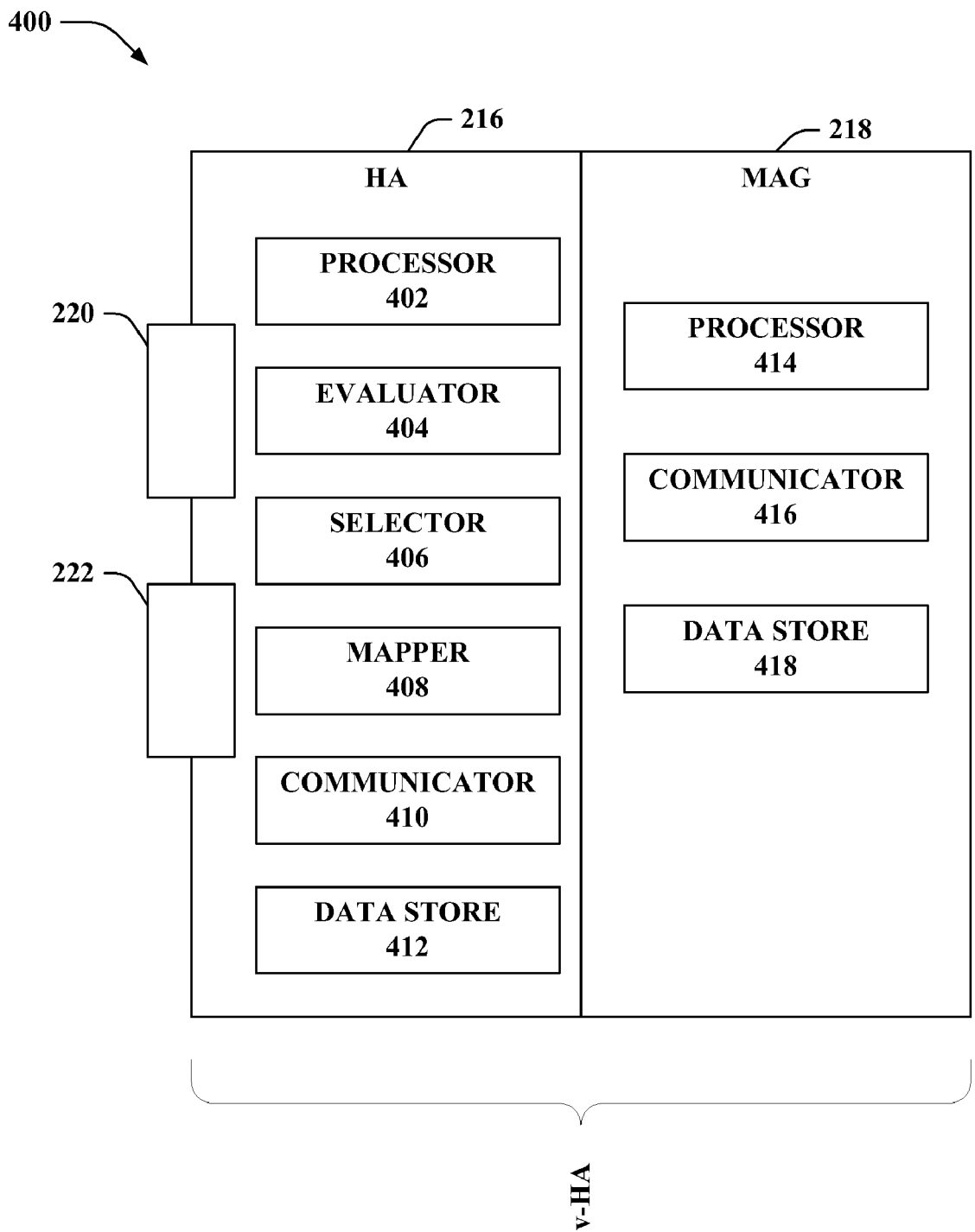
FIG. 4 is a depiction of an example system that can employ a virtual home agent (v-HA) to facilitate connection of a mobile device with a desired PDN in accordance with an aspect of the disclosed subject matter.

Turning to FIG. 4, illustrated is a system 400 that can employ a v-HA to facilitate connection of a mobile device with a desired PDN in accordance with an aspect of the disclosed subject matter. System 400 can comprise a v-HA that can include a HA 216 and a MAG 218, where the v-HA can receive a BU or PBU, including NAIs of mobile devices, and can access information regarding predefined v-HA to PDN mapping to facilitate selecting the proper v-HA to be employed to connect a mobile device to a desired PDN. HA 216 can comprise v-HAs, such as v-HA 220 and v-HA 222, that can be employed to connect a tunnel between a MAG (e.g., MAG 210) and the v-HA to facilitate establishing a connection to a desired h-HA (e.g., 224) and a desired PDN associated therewith. It is to be appreciated and understood that HA 216, MAG 218, v-HA 220, and v-HA 222 each can be the same or similar as, and/or can comprise the same or similar functionality as, respective components, such as more fully described herein, for example, with regard to system 100, system 200, system 250, and/or diagram 300.

In one aspect, HA 216 can further include a processor 402 that can comprise a processor, microprocessor, and/or controller dedicated to analyzing information received by the HA 216, generating information for transmission by HA 216, and/or controlling one or more components of HA 216. HA 216 can also include an evaluator 404 that can evaluate information received by the v-HA, where the information can be messages, such as BU or PBU that can include NAI of a mobile device, predefined v-HA to PDN mapping (e.g., information as to which v-HA to employ with regard to a particular PDN), address information regarding v-HAs and h-HAs, and/or other information, to facilitate determining whether the v-HA is the proper v-HA to use to facilitate connecting a mobile device to a desired PDN or, if not the proper v-HA, determining which v-HA is the proper v-HA to use to facilitate connecting a mobile device to a desired PDN, and/or determining a h-HA (e.g., HA 224) associated with the desired PDN. In still another aspect, HA 216 can contain a selector 406 that can facilitate selecting a proper v-HA, which can be a v-HA associated with the instant HA 216 or another v-HA, based at least in part on NAI associated with the mobile device, IP address information, and/or other information.

In another aspect, HA 216 can further comprise a mapper 408 that can facilitate mapping a tunnel between MAG 210 and a v-HA (e.g., 220, 222) with a tunnel from MAG 218 to a v-HA (e.g., 226, 228) associated with a h-HA (e.g., HA 224) to facilitate communicating information incoming from a tunnel to the proper outgoing tunnel. The mapper 408 also can facilitate concatenating tunnels to link tunnels to facilitate communication flow. For instance, a first tunnel between MAG 210 and a v-HA (e.g., 220) that serves a specified PDN (e.g., PDN1 212) and a second tunnel between MAG 218 and a v-HA (e.g., 226) of the h-HA (e.g., 224) that serves the specified PDN can be concatenated based at least in part on the mapping of the first tunnel to the second tunnel to facilitate communication flow from the MAG 210 and the h-HA. In another aspect, the mapper 408 can be utilized to create mappings between v-HAs and respective PDNs. The v-HA to PDN mapping can be stored as desired. HA 216 also can contain a communicator 410 that can facilitate receiving and/or transmitting information (e.g., receiving and/or transmitting data, receiving BU or PBU, receiving information from a desired database(s), transmitting HA-switch message, etc.) from and/or to HA 216.

In yet another aspect, HA 216 can include a data store 412 that can store information, such as mapping information to facilitate mapping incoming tunnels to outgoing tunnels (e.g., first tunnel to second tunnel associated with same PDN), IP address information, predefined v-HA to PDN mapping, information related to v-HAs and/or h-HAs, information related to determining a proper v-HA to use when establishing a connection between a mobile device and desired PDN, and/or other information, related to establishing a connection between a mobile device and desired PDN, and/or information related to the HA 216 and communication in the wireless communication environment.

In accordance with an aspect, the data store 412 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 412 is intended to comprise, without being limited to, these and any other suitable types of memory.

In yet another aspect, MAG 218 can comprise a processor 414 that can comprise a processor, microprocessor, and/or controller dedicated to analyzing information received by the MAG 218, generating information for transmission by MAG 218, and/or controlling one or more components of MAG 218.

In yet another aspect, MAG 218 can include a data store 418 that can store information, such as mapping information to facilitate mapping incoming tunnels to outgoing tunnels (e.g., first tunnel to second tunnel associated with same PDN), IP address information, information related to v-HAs and/or h-HAs, information related to determining a proper v-HA to use when establishing a connection between a mobile device and desired PDN, and/or other information, related to establishing a connection between a mobile device and desired PDN, and/or information related to the MAG 218 and communication in the wireless communication environment. MAG 218 also can contain a communicator 416 that can facilitate receiving and/or transmitting information (e.g., receiving and/or transmitting data, receiving and/or transmitting BU or PBU, receiving information from a desired database(s), etc.) from and/or to MAG 218.

In accordance with an aspect, the data store 418 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 418 is intended to comprise, without being limited to, these and any other suitable types of memory.

Figure 5:
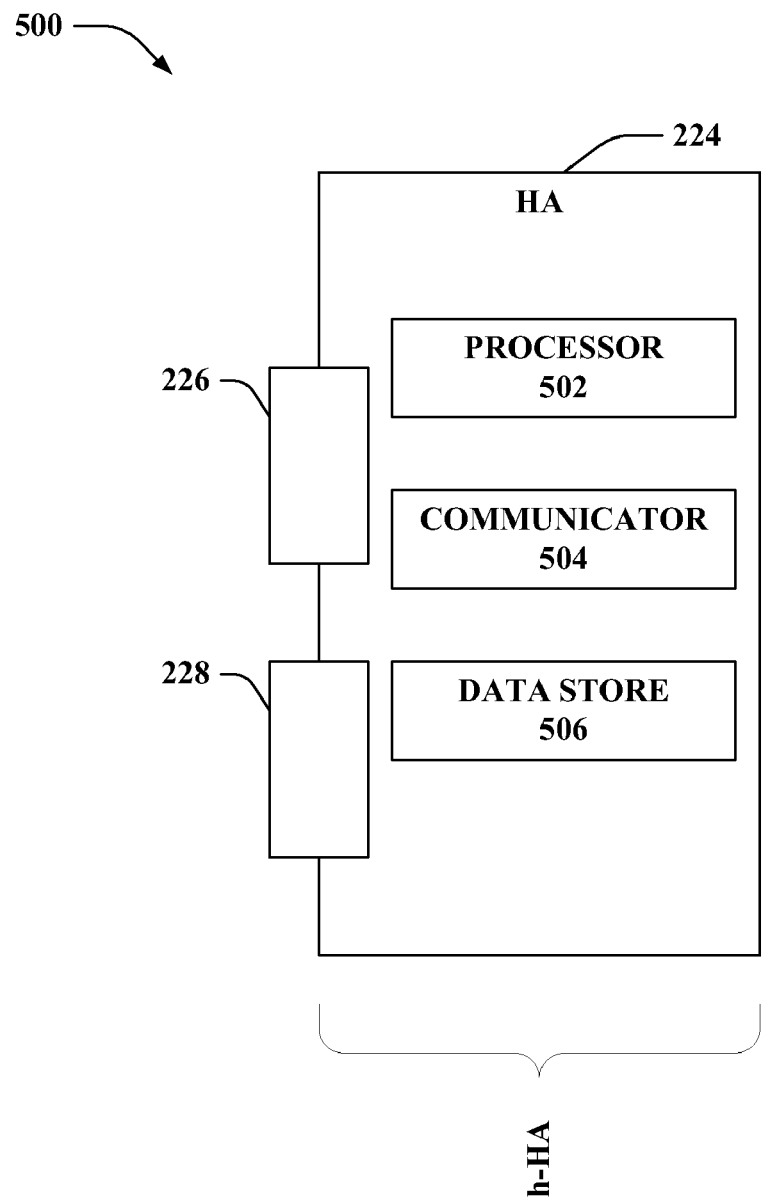
FIG. 5 is a depiction of an example system that can facilitate connecting a mobile device to a desired PDN to facilitate communication associated with the mobile device within a wireless communication environment in accordance with an aspect of the disclosed subject matter.

With reference to FIG. 5, illustrated is a system 500 that can facilitate connecting a mobile device to a desired PDN to facilitate communication associated with the mobile device within a wireless communication environment in accordance with an aspect of the disclosed subject matter. System 500 can include a h-HA, such as HA 224, that can be connected with and can serve one or more PDNs. The h-HA can include one or more v-HAs, such as v-HA 224 and v-HA 226, that can be utilized to facilitate connecting a mobile device, which can be connected to the v-HA via another component(s), to a desired PDN. It is to be appreciated and understood that HA 224, v-HA 224, and v-HA 226 each can be the same or similar as, and/or can comprise the same or similar functionality as, respective components, such as more fully described herein, for example, with regard to system 100, system 200, system 250, diagram 300, and/or system 400. It is also to be appreciated and understood that while two v-HAs are depicted in FIG. 5, the subject innovation is not so limited, as the subject innovation can employ one v-HA or more than one v-HA up to virtually any desired number of v-HAs.

In one aspect, the HA 224 can include a processor 502 that can comprise a processor, microprocessor, and/or controller dedicated to analyzing information received by the HA 224, generating information for transmission by HA 224, and/or controlling one or more components of HA 224, for example. In another aspect, the HA 224 also can include a communicator 504 that can facilitate receiving and/or transmitting information (e.g., receiving and/or transmitting data, receiving BU or PBU, receiving information from a desired database(s), etc.) from and/or to HA 224.

In yet another aspect, the HA 224 can comprise a data store 506 that can store information, such as received data, information that facilitates establishing a connection to another component(s), information that can facilitate communication of data, and/or other information, as well as information related to the mobile device 116 and communication in the wireless communication environment. For instance, when facilitating establishing a connection the mobile device 116 and a desired PDN, the HA 224 can retrieve desired information from the data store 506 and can provide retrieved information to one or more components (e.g., processor 502) of the HA 224 to facilitate communication associated with the mobile device 116 in the communication environment.

In accordance with an aspect, the data store 506 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 506 is intended to comprise, without being limited to, these and any other suitable types of memory.

Referring to FIGS. 6-9, methodologies relating to discovering a desired v-HA and h-HA to facilitate establishing a connection between a mobile device (e.g., 116, 202) and a desired PDN (e.g., PDN1 212) and communication by the mobile device with the desired PDN are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Figure 6:
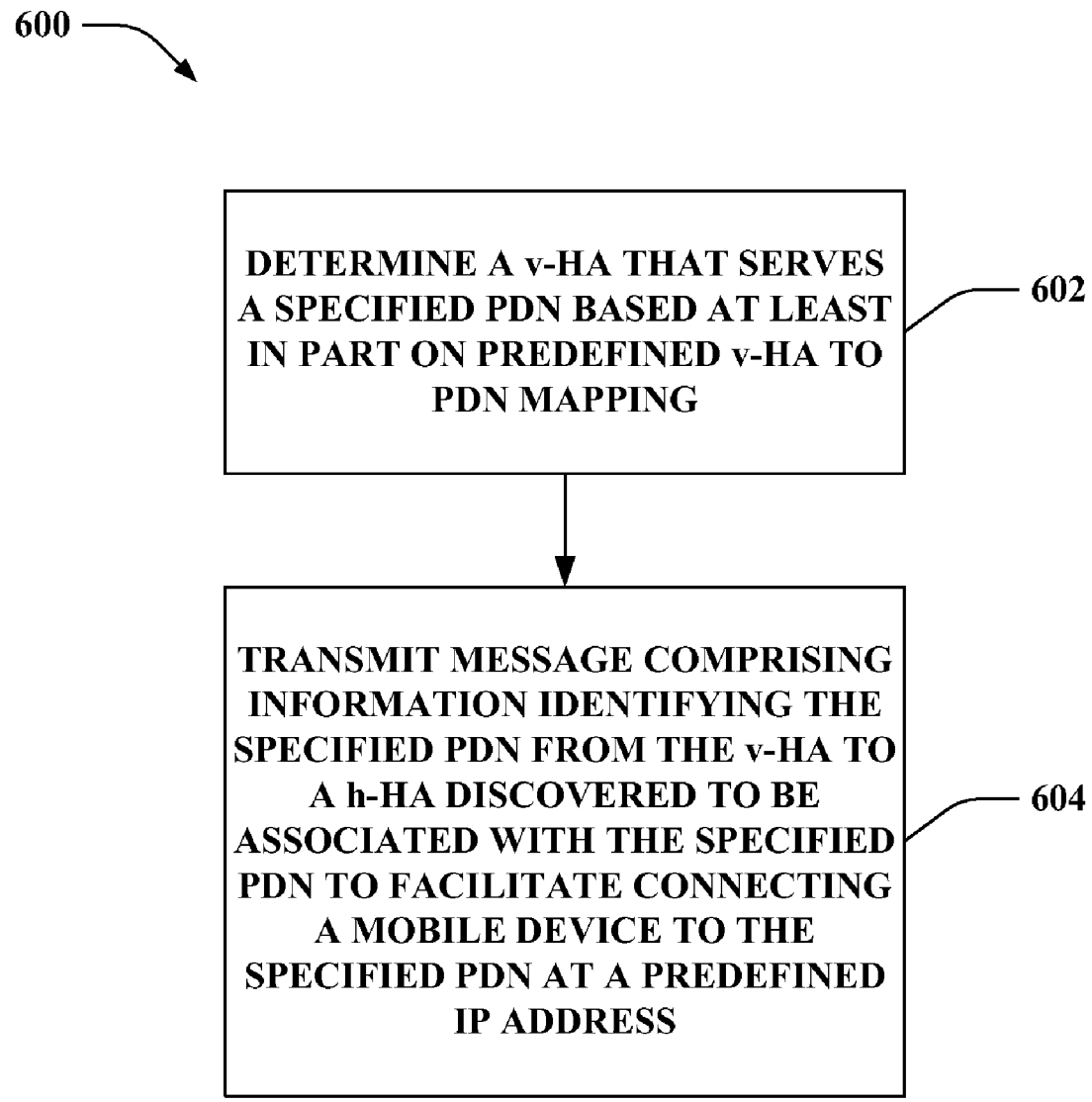
FIG. 6 is an illustration of another example methodology that can facilitate connecting a mobile device to a desired PDN in accordance with an aspect of the disclosed subject matter.

FIG. 6 illustrates a methodology 600 that can facilitate connecting a mobile device to a desired PDN in accordance with an aspect of the disclosed subject matter. Methodology 600 can facilitate connecting mobile devices to respective PDNs at specified IP addresses, respectively, even if the PDNs utilize an IP address(es) that overlaps with an IP address(es) of another PDN(s).

At 602, a v-HA that serves a specified PDN can be determined based at least in part on a predefined v-HA to PDN mapping. In one aspect, a v-HA (e.g., v-HA comprising HA 216) can receive a PBU (or BU) from a MAG 210 associated therewith, where the PBU can contain information (e.g., NAI) that can identify the specified PDN and/or a mobile device that desires to connect with the specified PDN. The MAG can be connected with the mobile device via an access network 208. The HA 216 can analyze the NAI and the v-HA to PDN mapping, which can be retrieved from a database that can be accessed by HA 216, to determine whether the instant v-HA is the correct v-HA that serves the specified PDN. If the HA 216 determines that the instant v-HA serves the specified PDN, methodology 600 can proceed to reference numeral 604. If the HA 216 determines that the instant v-HA does not serve the specified PDN, HA 216 can send a HA-switch message to MAG 210 that can indicate the correct v-HA (e.g., a v-HA that currently serves the specified PDN or a new v-HA that can serve the specified PDN) to facilitate redirecting the PBU (or BU) to the correct v-HA. The MAG 210 can transmit a PBU to the correct v-HA that serves the specified PDN based at least in part on the information contained in the HA-switch message.

At 604, a message that can comprise information that can identify the specified PDN can be transmitted from the v-HA to a h-HA discovered to be associated with the specified PDN to facilitate connecting the mobile device to the specified PDN at a predefined IP address. In accordance with an aspect, the HA (e.g., 216) of the correct v-HA (e.g., v-HA associated with HA 216) can determine (e.g., discover) the correct h-HA (e.g., HA 224) that serves the specified PDN. The HA can transmit a PBU (or BU) to the correct h-HA that serves the specified PDN, where the PBU (or BU) can include information that can facilitate identifying the specified PDN and/or the mobile device that desires to connect to the specified PDN. The h-HA can receive the PBU (or BU), and based at least in part on the PBU (or BU), the h-HA can facilitate connecting the mobile device to the specified PDN.

In one aspect, a first tunnel can be created between the MAG 210 and a desired v-HA (e.g., v-HA 220 associated with HA 216 of the correct v-HA). A second tunnel can be created between MAG 218 (of the correct v-HA) and the correct h-HA (e.g., HA 224). The first tunnel can be mapped to the second tunnel to facilitate connecting the mobile device to the correct h-HA, which can facilitate connecting the mobile device to the specified PDN served by the correct h-HA. For instance, the first tunnel and the second tunnel can be concatenated based at least in part on the mapping of the first tunnel to the second tunnel to facilitate communication flow between the two tunnels.

Figure 7:
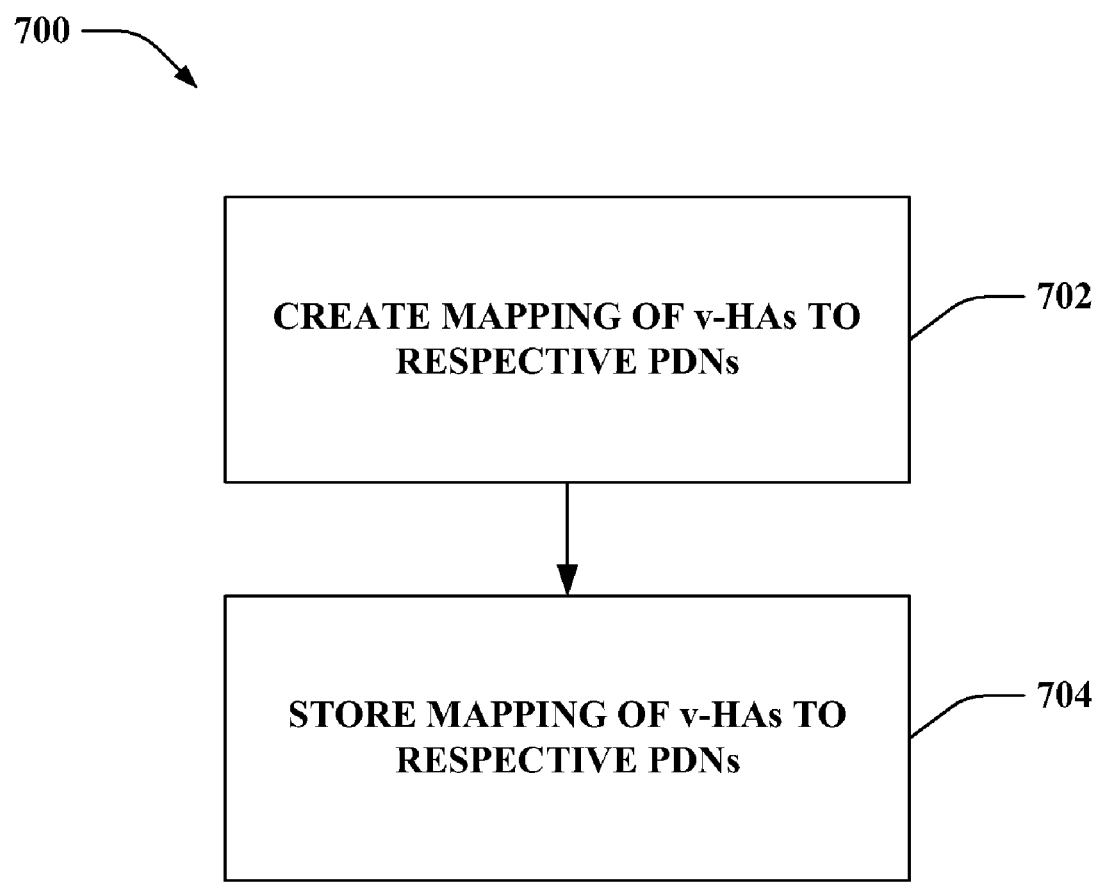
FIG. 7 is an illustration of an example methodology that can create a mapping of v-HAs to PDNs to facilitate communications associated with a mobile device in a wireless communication system in accordance with an aspect of the disclosed subject matter.

With reference to FIG. 7, illustrated is a methodology 700 that can create a mapping of v-HAs to PDNs to facilitate communications associated with a mobile device in a wireless communication system in accordance with an aspect of the disclosed subject matter. At 702, a mapping of v-HAs to respective PDNs can be created. In one aspect, a HA (e.g., 216) can facilitate creating a mapping of v-HAs to respective PDNs in the communication environment. The mapping can be utilized to facilitate discovering a proper v-HA and/or h-HA to be utilized when establishing a connection of a mobile device to a desired PDN.

At 704, the mapping of v-HAs to respective PDNs can be stored. In one embodiment, a central database can be utilized, where the created mapping can be stored in the central database, which can be contained in a stand-alone data store or can be stored in a "master" HA. In accordance with another embodiment, multiple HAs (e.g., 216) each can have respective databases that each can have stored therein the mapping of v-HAs to respective PDNs, where each HA can have a data store in which the mapping database can be stored.

Figure 8:
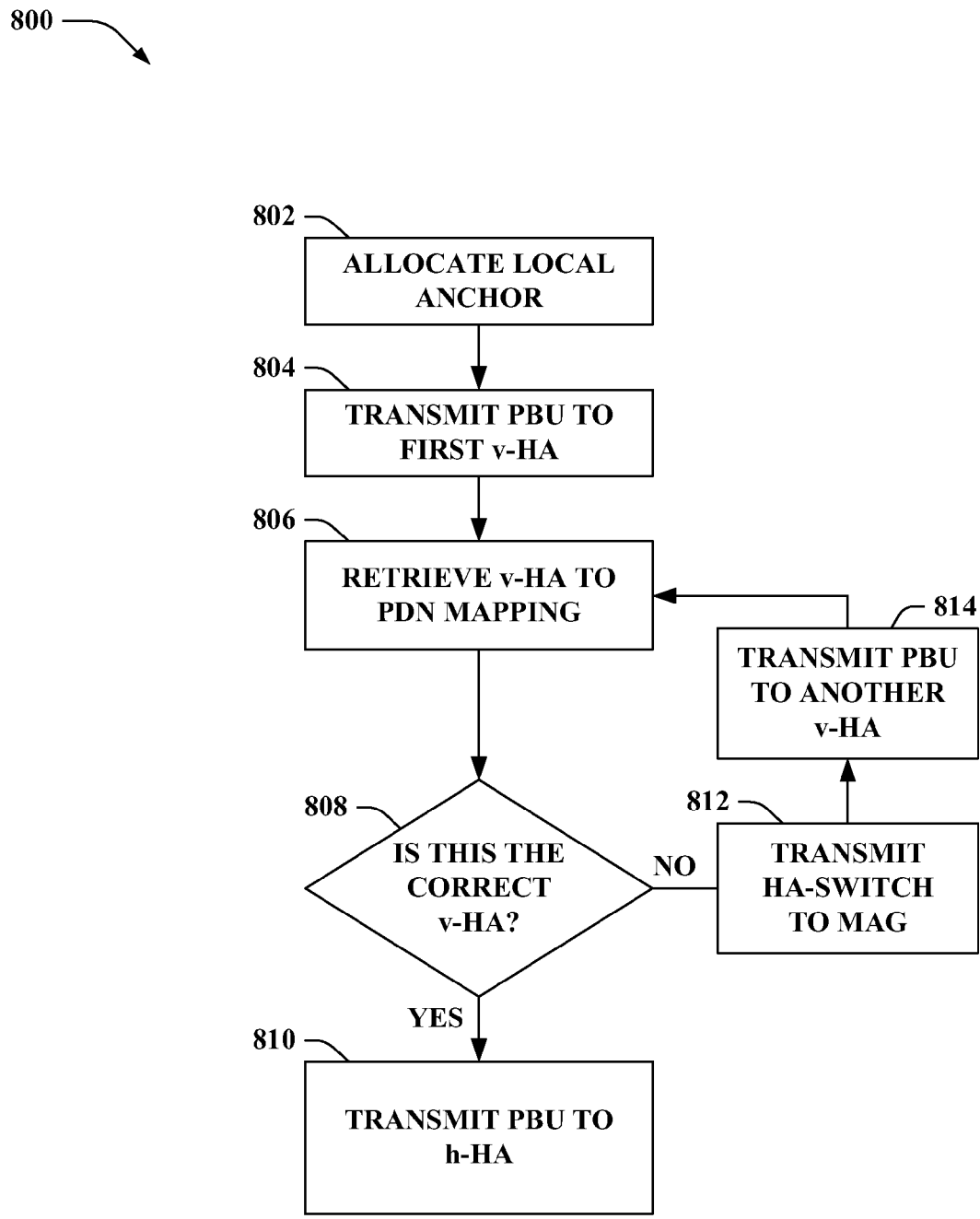
FIG. 8 is a depiction of an example methodology that can facilitate discovering a desired v-HA and h-HA to facilitate connecting a mobile device to a desired PDN in accordance with an aspect of the disclosed subject matter.

Turning to FIG. 8, illustrated is a methodology 800 that can facilitate discovering a desired v-HA and h-HA to facilitate connecting a mobile device to a desired PDN in accordance with an aspect of the disclosed subject matter. Often, a number of PDNs can be associated with a communication environment, where two or more PDNs can have overlapping address spaces. Methodology 800 can facilitate efficient connection of mobile devices to desired PDNs, respectively, while also ensuring that, even if there are overlapping address spaces, connection of and communication by each mobile device is to the proper IP address and the proper PDN.

At 802, a local anchor can be allocated. In one aspect, a mobile device (e.g., 202) can desire to connect and communicate with a specified PDN (e.g., PDN1 212) in a communication environment. The mobile device can be connected to a MAG 210 via an access network 208. The MAG 210 can allocate a local anchor with regard to the mobile device. At 804, a PBU can be transmitted to a first v-HA. In one aspect, the MAG 210 can transmit a PBU to a first v-HA (e.g., v-HA comprising HA 216). The PBU can include information, such as NAI, of the mobile device to facilitate identifying the PDN to which the mobile device desires to connect.

At 806, a v-HA to PDN mapping can be retrieved. In accordance with an aspect, a v-HA to PDN mapping can be stored in a database that can be accessed by HA 216. The mapping can be utilized to facilitate discovering the proper v-HA to be employed in order to connect the mobile device the desired PDN.

At 808, a determination can be made as to whether the instant v-HA is the proper HA. In one aspect, the HA 216 can evaluate the information in the PBU (e.g., NAI) and the v-HA to PDN mapping to facilitate discovering the proper v-HA to use to connect the mobile device to the desired PDN. If it is determined that the instant v-HA (e.g., v-HA1, comprising HA 216) is the correct v-HA, at 810, a PBU can be transmitted to a h-HA. In an aspect, if the HA 216 determines that the v-HA with which it is associated is the proper v-HA based at least in part on the v-HA to PDN mapping and the received NAI, the HA 216 can transmit a PBU to a h-HA, as provided in the v-HA to PDN mapping, where the h-HA can be associated with the desired PDN. A first tunnel can be created between MAG 210 and the v-HA (e.g., 220), and a second tunnel can be created between MAG 218 and a v-HA (e.g., 226) associated with the HA 224 (e.g., h-HA). The first tunnel can be mapped to the second tunnel, and the first tunnel and second tunnel can be concatenated (e.g., linked) based at least in part on the mapping, to facilitate establishing the connection between the mobile device (e.g., 202) and the desired PDN (e.g., PDN1 212).

Referring again to reference numeral 808, if, at 808, it is determined that the instant v-HA is not the correct v-HA, at 812, a HA-switch message can be transmitted. In an aspect, if the HA 216 determines that the instant v-HA with which it is associated is not the proper v-HA, HA 216 can transmit a HA-switch message to MAG 210. The HA-switch message can indicate the instant v-HA is not the correct v-HA for establishing a connection to the desired PDN and/or can indicate the correct v-HA to be used with regard to the desired PDN, as determined by HA 216 based at least in part on the v-HA to PDN mapping. At 814, a PBU can be transmitted to another v-HA. In accordance with an aspect, the MAG 210 can transmit a PBU, including NAI, associated with the mobile device to another v-HA (e.g., v-HA2, comprising HA 302). If the HA-switch message included the address to the correct v-HA to be used with regard to the PDN, MAG 210 can select that v-HA and can transmit the PBU to the v-HA specified in the HA-switch message. If the HA-switch message did not include the address to the correct v-HA, MAG 210 can select a v-HA, as desired, from a pool of known v-HAs, which can be retrieved from a database, and can transmit the PBU to the selected v-HA. Methodology 800 can return to reference numeral 806, where methodology can continue to proceed from that point until the correct v-HA is located, and the correct v-HA transmits a PBU associated with the mobile device to the h-HA associated with the desired PDN to facilitate establishing a connection between the mobile device and the desired PDN.

Figure 9:
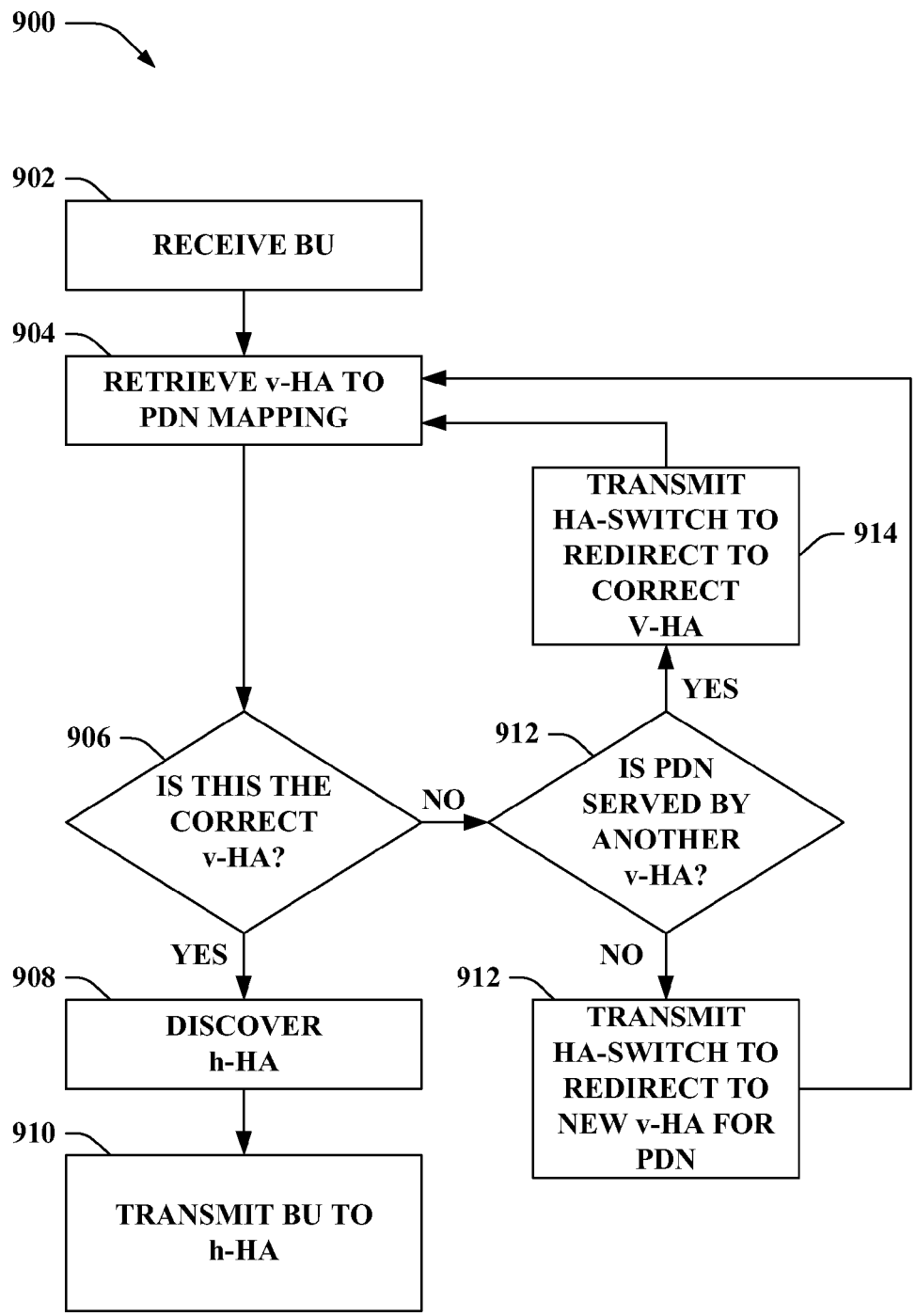
FIG. 9 is an illustration of another example methodology that can facilitate discovering a desired v-HA and "home" home agent (h-HA) to facilitate connecting a mobile device to a desired PDN in accordance with an aspect of the disclosed subject matter.

Referring to FIG. 9, depicted is another methodology 900 that can facilitate discovering a desired v-HA and h-HA to facilitate connecting a mobile device to a desired PDN in accordance with an aspect of the disclosed subject matter. Often, a plurality of PDNs can be associated with a communication environment, where two or more PDNs may have overlapping address spaces. Methodology 900 can facilitate efficient connection of mobile devices to desired PDNs, respectively, while also ensuring that, even if there are overlapping address spaces, connection of each mobile device is to the correct IP address and correct PDN.

At 902, a BU can be received. In accordance with an aspect, a v-HA (e.g., v-HA comprising HA 216) can receive a BU from MAG 210. The BU can include information (e.g., identification information) relating to a mobile device that desires to connect to particular PDN using a particular IP address that potentially could overlap with an IP address being used by another communication device with regard to a disparate PDN in the communication environment. At 904, a v-HA to PDN mapping can be retrieved. In one aspect, HA 216 can retrieve a v-HA to PDN mapping can be retrieved from a database that can be accessed by HA 216. The v-HA to PDN mapping can be utilized to facilitate determining whether the instant v-HA is the correct v-HA to be employed to facilitate connecting the mobile device to a h-HA associated with the desired PDN.

At 906, a determination can be made regarding whether the instant v-HA is the correct v-HA. In an aspect, the HA 216 can evaluate the received BU, including information that can identify the mobile device, and the v-HA to PDN mapping to determine whether the instant v-HA is the correct v-HA (e.g., v-HA associated with desired h-HA that is associated with the desired PDN, as provided in the v-HA to PDN mapping). If it is determined that the instant v-HA is the correct v-HA, at 908, the desired h-HA can be discovered. In one aspect, if the HA 216 associated with the instant v-HA determines that the instant v-HA is the correct v-HA, the HA 216 can discover the upstream h-HA (e.g., HA 224) that is associated with the desired PDN. The h-HA can be determined based at least in part on the v-HA to PDN mapping. At 910, a BU can be transmitted to the h-HA. The h-HA can utilize the BU to facilitate connecting the mobile device to the desired PDN associated with the h-HA. In another aspect, a first tunnel can be created between MAG 210 and the v-HA (e.g., 220), and a second tunnel can be created between MAG 218 and a v-HA (e.g., 226) associated with the HA 224 (e.g., h-HA). The first tunnel can be mapped to the second tunnel and the first tunnel and second tunnel can be concatenated based at least in part on the mapping (e.g., utilizing the mapping), to facilitate establishing the connection between the mobile device (e.g., 202) and the desired PDN (e.g., PDN1 212).

Referring again to reference numeral 906, if, at 906, it is determined that the instant v-HA is not the correct v-HA, at 912, a determination can be made as to whether the desired PDN is served by another v-HA. According to an aspect, the HA 216 can analyze the v-HA to PDN mapping to facilitate determining whether the desired PDN is currently served by another v-HA. If it is determined that the desired PDN is currently served by another v-HA, at 914, a HA-switch message, which can contain information that can facilitate redirecting to the correct v-HA, can be transmitted. In one aspect, the HA 216 can determine that the desired PDN is currently served by another v-HA, based at least in part on the v-HA to PDN mapping. HA 216 can transmit a HA-switch message, which can contain information indicating the correct v-HA that is serving the desired PDN, to MAG 210. Methodology 900 can return to reference numeral 904 and can proceed from that point to discover the correct v-HA and h-HA, and transmit a BU to the h-HA that is serving the desired PDN.

Referring again to reference numeral 912, if, at 912, it is determined that the desired PDN is not currently served by a v-HA, a HA-switch message, which can contain information that can facilitate redirecting to a new v-HA to serve the PDN, can be transmitted. In an aspect, HA 216 can determine that the desired PDN is currently not being served by another v-HA, based at least in part on the v-HA to PDN mapping. HA 216 can transmit a HA-switch message to MAG 210. In one embodiment, HA 216 can select an available new v-HA that can be used to serve the desired PDN and the HA-switch message can contain information indicating the new v-HA that can serve the desired PDN. In another embodiment, the HA-switch message can provide a list of available new v-HAs that can be utilized to serve the desired PDN, and the MAG 210 can select a new v-HA from the list. In yet another embodiment, the HA-switch message can indicate that the desired PDN is not currently served by a v-HA, and MAG 210 can retrieve a list of available new v-HAs and can select a new v-HA that can serve the desired PDN. Methodology 900 can return to reference numeral 904 and can proceed from that point to discover the correct v-HA and h-HA, and transmit a BU to the h-HA that is serving the desired PDN.

It will be appreciated that, in accordance with one or more aspects described herein, inferences can be made relating to whether a particular v-HA can serve or does serve a particular PDN; discovering a h-HA that serves a desired PDN; and/or communication associated with the mobile device(s) 116 in the network. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

For example, one or more methods presented above can include making an inference(s) pertaining to whether a particular v-HA (e.g., new v-HA or otherwise) can serve a particular PDN, discovering a desired h-HA that can serve a desired PDN, etc. It will be appreciated that the foregoing examples are illustrative in nature and are not intended to limit the number of inferences that can be made or the manner in which such inferences are made in conjunction with the various embodiments and/or methods described herein.

FIG. 10 is an illustration of a mobile device 1000 that can facilitate communications associated with a mobile device in a wireless communication system in accordance with an aspect of the disclosed subject matter. It is to be appreciated that the mobile device 1000 can be the same or similar as, and/or can comprise the same or similar functionality as, mobile device (e.g., 116, 202, 252), as more described herein, for example, with regard to system 100, system 200, system 250, diagram 300, system 400, system 500, methodology 600, methodology 700, methodology 800, and methodology 900.

Mobile device 1000 can comprise a receiver 1002 that receives a signal from, for instance, a receive antenna (not shown), and performs typical actions thereon (e.g., filters, amplifies, downconverts, etc.) the received signal and digitizes the conditioned signal to obtain samples. Receiver 1002 can be, for example, an MMSE receiver, and can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1008, a processor that controls one or more components of mobile device 1000, and/or a processor that both analyzes information received by receiver 1002, generates information for transmission by transmitter 1008, and controls one or more components of mobile device 1000. Mobile device 1000 can also comprise a modulator 1010 that can work in conjunction with the transmitter 1008 to facilitate transmitting signals (e.g., data) to, for instance, a base station 102, another mobile device, etc.

In one aspect, the processor 1006 can be connected to an identifier 1012 that can facilitate providing information that can identify the mobile device, identifying a desired PDN with which the mobile device 1000 desires to connect and communicate, and/or other information related to identification associated with the mobile device 1000. In another aspect, the mobile device 1000 optionally can include a C-MAG 1014, where when the C-MAG 1014 is included in mobile device 1000, the processor 1006 can be connected to a C-MAG 1014, which can facilitate transmitting a BU to a desired v-HA (e.g., v-HA 220) in accordance with CMIP in order to facilitate establishing a connection with a v-HA that serves a PDN to which a connection with the mobile device 1000 is desired. The C-MAG 1014 also can receive a HA-switch message from a v-HA if it is determined by the v-HA that it is not the v-HA that serves the desired PDN. In such instance, the C-MAG 1014 can redirect (e.g., re-transmit) a BU message to the correct v-HA that serves the desired PDN based at least in part on the HA-switch message in order to facilitate connecting to the correct v-HA.

In still another aspect, the processor 1006 can be coupled to a data store 1014 that can be operatively coupled to processor 1006 and can store data to be transmitted, received data, information related to base stations (e.g., base station 102), information related to the mobile device 1000, information related to a PDN(s) (e.g., PDN1 212, PDN2, 214), and/or any other suitable information that can facilitate communication of data associated with the mobile device 1000. Data store 1014 can additionally store protocols and/or algorithms associated with transmitting identifier information (e.g., information that identifies the mobile device 1000 and/or identifies a PDN with which a connection and/or communication is desired), transmitting messages (e.g., BU) to a v-HA, receiving a HA-switch message, redirecting messages to another v-HA based at least in part on a received HA-switch message, storing information, retrieving information, and/or other functions related to the mobile device 1000.

In accordance with an aspect, the data store 1014 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 1014 is intended to comprise, without being limited to, these and any other suitable types of memory. It is to be appreciated and understood that the data store can be a stand-alone unit (as depicted), can be included within the processor 1006, can be incorporated within another component, and/or virtually any suitable combination thereof, as desired.

Figure 11:
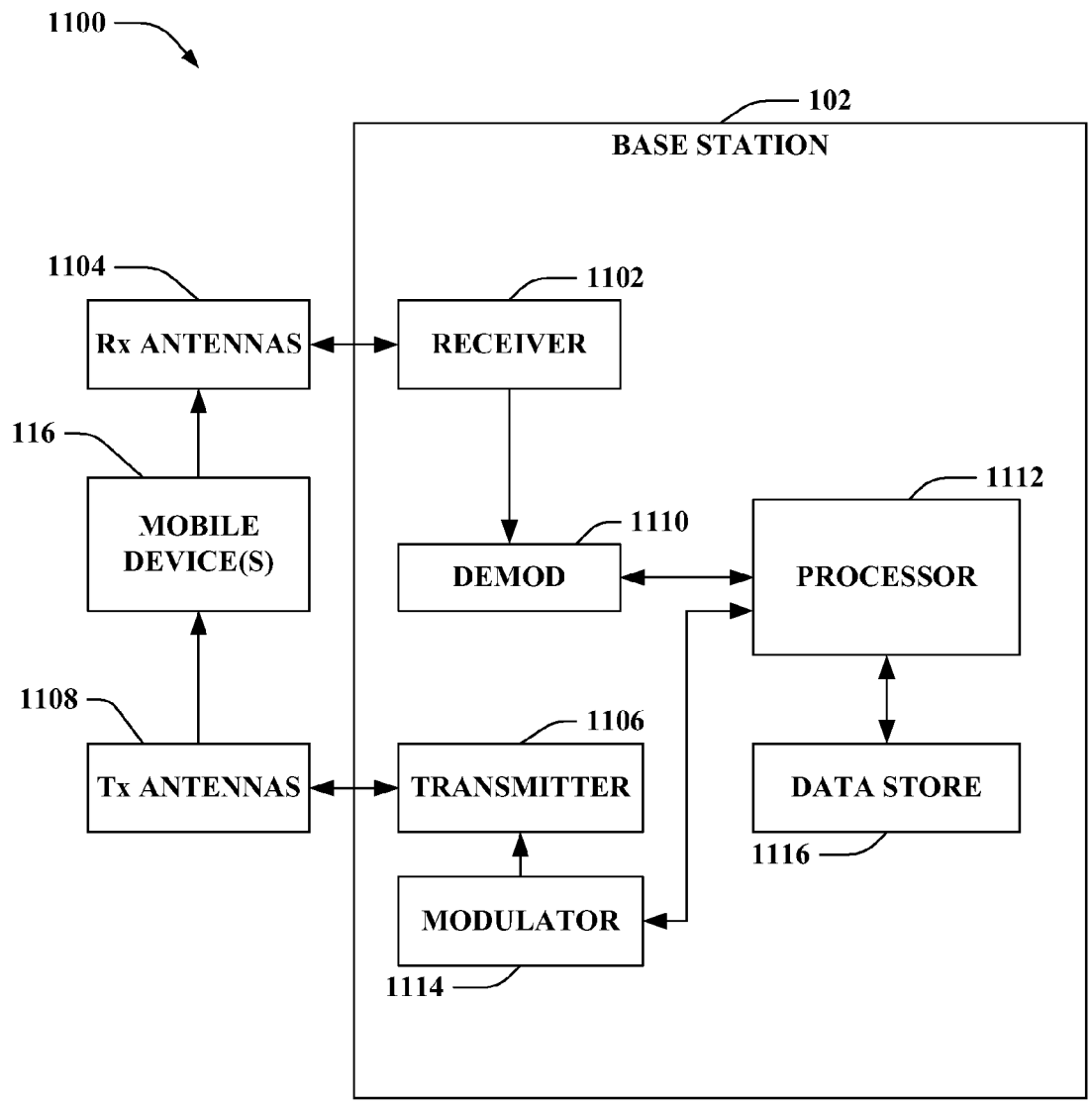
FIG. 11 is a depiction of an example system that can facilitate communications associated with a mobile device in a wireless communication system in accordance with an aspect of the disclosed subject matter.

FIG. 11 is an illustration of a system 1100 that can facilitate communications associated with a mobile device in a wireless communication system in accordance with an aspect of the disclosed subject matter. System 1100 can comprise a base station 102 (e.g., access point, . . . ). The base station 102 can include a receiver 1102 that can receive signal(s) from one or more mobile devices 116 through a plurality of receive antennas 1104, and a transmitter 1106 that can transmit signals (e.g., data) to the one or more mobile devices 116 through a transmit antenna 1108. Receiver 1102 can receive information from receive antennas 1104 and can be operatively associated with a demodulator 1110 that can demodulate received information. Demodulated symbols can be analyzed by a processor 1112 that can be a processor dedicated to analyzing information received by receiver 1102 and/or generating information for transmission by a transmitter 1106, a processor that controls one or more components of base station 102, and/or a processor that both analyzes information received by receiver 1102, generates information for transmission by transmitter 1106, and controls one or more components of base station 102. The base station 102 can also comprise a modulator 1114 that can work in conjunction with the transmitter 1106 to facilitate transmitting signals (e.g., data) to, for instance, a mobile device 116, another device, etc.

Processor 1112 can be coupled to a data store 1116 that can store information related to data to be transmitted, received data, information related to base stations (e.g., base station 102), information related to a mobile device (e.g., 116), and/or any other suitable information that can facilitate communication of information (e.g., voice, data) associated with a mobile device (e.g., 116). Data store 1116 can additionally store protocols and/or algorithms associated with and facilitating communicating with a mobile device, another base station, or another device; evaluating information associated with a mobile device 116, the base station 102, or another base station (e.g., 502); selecting a base station with which a mobile device 116 can communicate in the network, etc.

In accordance with an aspect, the data store 1116 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 1116 is intended to comprise, without being limited to, these and any other suitable types of memory. It is to be appreciated and understood that the data store can be a stand-alone unit (as depicted), can be included within the processor 1112, can be incorporated within another component, and/or virtually any suitable combination thereof, as desired.

Figure 12:
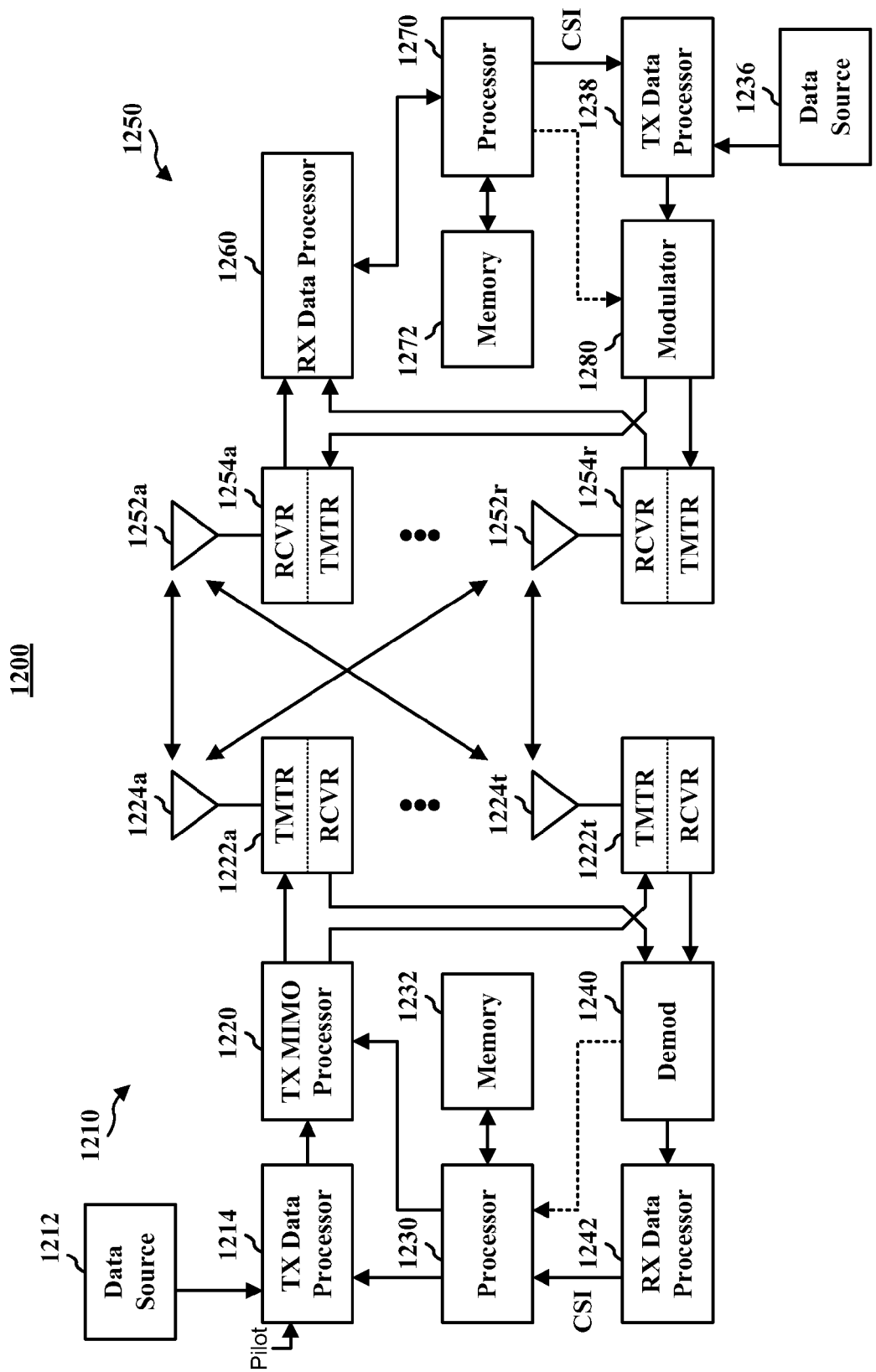
FIG. 12 is an illustration of an example wireless network system that can be employed in conjunction with the various systems and methods described herein.

FIG. 12 shows an example wireless communication system 1200 in accordance with an aspect of the disclosed subject matter. The wireless communication system 1200 depicts one base station 1210 and one mobile device 1250 for sake of brevity. However, it is to be appreciated that system 1200 can include more than one base station and/or more than one mobile device, wherein additional base stations and/or mobile devices can be substantially similar or different from example base station 1210 and mobile device 1250 described below. In addition, it is to be appreciated that base station 1210 and/or mobile device 1250 can employ the systems (FIGS. 1, 2A, 2B, 4, 5, 10-11) and/or methods (FIGS. 6-9) described herein to facilitate wireless communication there between. It is to be appreciated that base station 1210 and mobile device 1250 each can be respectively the same or similar as, and/or can comprise respectively the same or similar functionality as, respective components as more fully described herein, such as, for example, with regard to system 100, diagram 200, system 250, diagram 300, diagram 400, system 500, system 600, system 1000, and/or system 1100.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At mobile device 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 can periodically determine which precoding matrix to use (discussed below). Further, processor 1270 can formulate a reverse link message comprising a matrix index portion and a rank value portion.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 can process the extracted message and can determine which precoding matrix to use for determining the beamforming weights.

Processors 1230 and 1270 can direct (e.g., control, coordinate, manage, etc.) operation at base station 1210 and mobile device 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In an aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels can comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), Load Indicator Channel (LICH).

The UL PHY Channels can comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), Broadband Pilot Channel (BPICH).

In an aspect, a channel structure is provided that preserves low PAR (at any given time, the channel is contiguous or uniformly spaced in frequency) properties of a single carrier waveform.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 13:
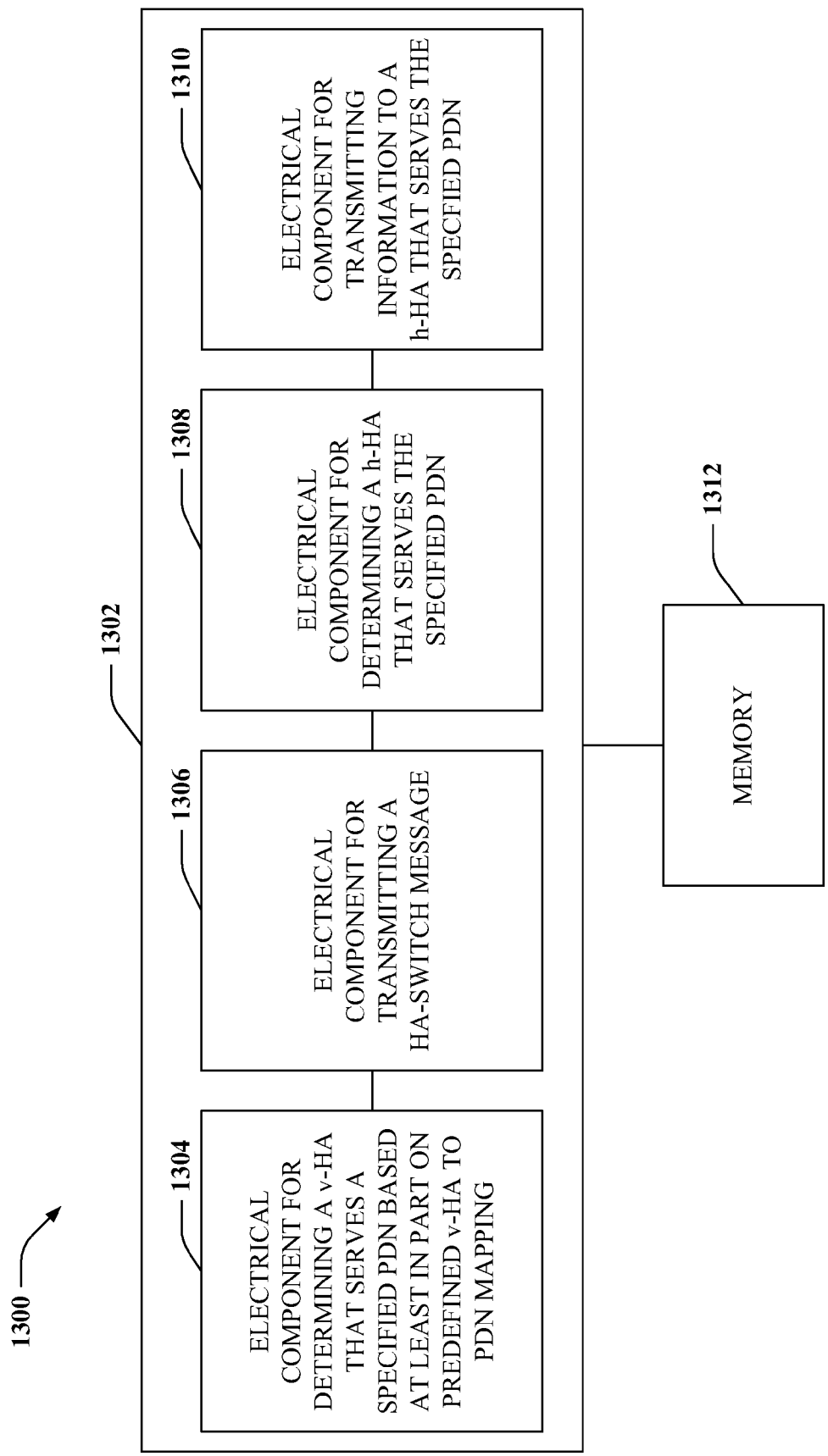
FIG. 13 is a depiction of an example system that can facilitate communication associated with a mobile device in a wireless communication environment.

With reference to FIG. 13, illustrated is a system 1300 that can facilitate communication associated with a mobile device in a wireless communication environment. For example, system 1300 can reside at least partially within a v-HA. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction.

For instance, logical grouping 1302 can include an electrical component for determining a v-HA that serves a specified PDN based at least in part on predefined v-HA to PDN mapping 1304. For instance, electrical component 1304 can receive information, such as a PBU or BU from a MAG (e.g., 210) or mobile device (e.g., 252), that can facilitate identifying a specified PDN to which a mobile device (e.g., 202, 252) desires to connect. Electrical component 1304 can evaluate a v-HA to PDN mapping that can be retrieved from a database and the received information (e.g., PBU) to determine whether the instant v-HA is the correct v-HA that serves the specified PDN.

Further, logical grouping 1302 can comprise an electrical component for transmitting a HA-switch message 1306. In one aspect, the electrical component 1306 can transmit a HA-switch message to a MAG 210 or mobile device (e.g., 252), if it is determined that the instant v-HA is not the v-HA that serves the specified PDN. The HA-switch message can contain information, such as information that can indicate that the instant v-HA is not the v-HA that serves the specified PDN, information indicating the correct v-HA that serves the specified PDN, and/or other information. The correct v-HA can be determined based at least in part on the v-HA to PDN mapping.

Logical grouping 1302 also can include an electrical component for determining a h-HA that serves the specified PDN 1308. In an aspect, the electrical component 1308 can analyze received information (e.g., PBU, BU), which can identify the specified PDN and/or the mobile device that desires to connect to the specified PDN, and/or other information, which can facilitate determining the h-HA (e.g., HA 224) that serves the specified PDN.

Logical grouping 1302 can further include an electrical component for transmitting information to a h-HA that serves the specified PDN 1310. In one aspect, electrical component 1310 can transmit information, such as a PBU or BU, that can facilitate connecting the mobile device to the specified PDN. The transmitted information can be information that can facilitate identifying the specified PDN and/or the mobile device that desires to connect with the specified PDN.

Additionally, system 1300 can include a memory 1312 that can retain instructions for executing functions associated with electrical components 1304, 1306, 1308, and 1310. While shown as being external to memory 1312, it is to be understood that one or more of electrical components 1304, 1306, 1308, and 1310 can exist within memory 1312.

Figure 14:
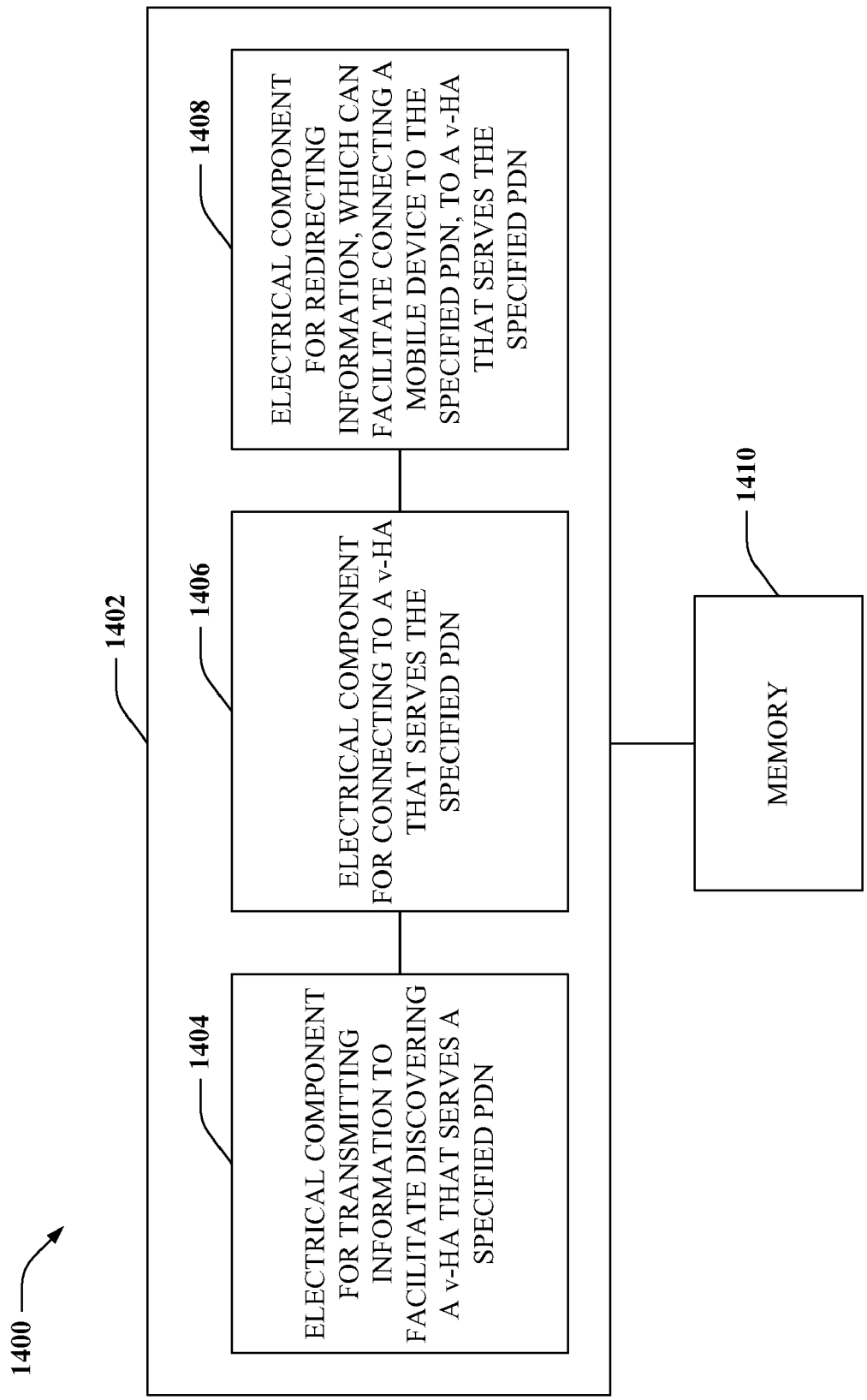
FIG. 14 is an illustration of another example system that can facilitate communication associated with a mobile device in a wireless communication environment.

Turning to FIG. 14, illustrated is a system 1400 that can facilitate communication associated with a mobile device in a wireless communication environment. For example, system 1400 can reside at least partially within a MAG (e.g., MAG 210) that can be associated (e.g., wirelessly connected) with a mobile device (e.g., 116) via an access network 208. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction.

In one aspect, logical grouping 1402 can include an electrical component for transmitting information that can facilitate discovering a v-HA that serves a specified PDN 1404. According to an aspect, electrical component 1404 can transmit information, such as PBU (or BU) that can comprise an NAI associated with the mobile device, to a selected v-HA, where such information can facilitate determining (e.g., discovering) a v-HA that serves a specified PDN. The selected v-HA can receive and analyze the information, as well as a predefined v-HA to PDN mapping, to determine whether the v-HA serves the specified PDN. Further, logical grouping 1402 can comprise an electrical component for connecting to a v-HA that serves the specified PDN 1406. In one aspect, electrical component 1406 can establish a connection to a v-HA that has been determined to serve the specified PDN.

Logical grouping 1402 also can include an electrical component for redirecting information, which can facilitate connecting a mobile device to the specified PDN, to a v-HA that serves the specified PDN 1408. In one aspect, if it has been determined that the instant v-HA does not serve the specified PDN based at least in part on the predefined v-HA to PDN mapping, the instant v-HA can determine which v-HA does serve the specified PDN, and can transmit a HA-switch message to an electrical component associated with electrical component 1408. Based at least in part on the information contained in the HA-switch message, the electrical component 1408 can redirect information, such as PBU (or BU) comprising NAI associated with the mobile device, which can facilitate connecting the mobile device to the specified PDN, to a v-HA that serves the specified PDN, as determined based at least in part on the predefined v-HA to PDN mapping. Additionally, system 1400 can include a memory 1410 that can retain instructions for executing functions associated with electrical components 1404, 1406, and 1408. While shown as being external to memory 1410, it is to be understood that one or more of electrical components 1404, 1406, and 1408 can exist within memory 1410.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates communication associated with a mobile device, comprising:
   determining a virtual home agent that serves a specified public data network based at least in part on predefined virtual home agent-to-public data network mapping; and
   transmitting a message, comprising information identifying the specified public data network, from the virtual home agent to a home home-agent discovered to be associated with the specified public data network to facilitate connecting the mobile device to the specified public data network at a predefined internet protocol space, the mobile device is connected to the specified public data network via a first tunnel created between a first mobile access gateway and the virtual home agent that serves the specified public data network and a second tunnel created between a second mobile access gateway associated with the virtual home agent and the home home-agent, the first tunnel is based on at least one of a client mobile internet protocol or a proxy mobile internet protocol and the second tunnel is based on a proxy mobile internet protocol, wherein the virtual home agent comprises the second mobile access gateway that connects directly to the home home-agent.

2. The method of claim 1, further comprising:
   determining whether another virtual home agent serves the specified public data network if it is determined that an instant virtual home agent is not the virtual home agent that serves the specified public data network, based at least in part on the predefined virtual home agent-to-public data network mapping; and
   transmitting a home agent switch message if it is determined that the instant virtual home agent is not the virtual home agent that serves the specified public data network to facilitate redirecting a message, comprising information identifying the specified public data network, to another virtual home agent that serves the specified public data network.

3. The method of claim 2, the another virtual home agent is at least one of a virtual home agent that currently serves the specified public data network or a new virtual home agent configured to serve the specified public data network.

4. The method of claim 1, further comprising:
   creating the first tunnel between a first mobile access gateway associated with the mobile device and the virtual home agent that serves the specified public data network;
   creating the second tunnel between a second mobile access gateway associated with the virtual home agent and the home home-agent; and
   mapping the first tunnel to the second tunnel, the first tunnel and second tunnel are concatenated to facilitate connecting the mobile device to the specified public data network.

5. The method of claim 4, further comprising:
   creating at least one other first tunnel between the first mobile access gateway associated with at least one other mobile device and at least one other virtual home agent that serves at least one other public data network;
   creating at least one other second tunnel between the second mobile access gateway associated with the at least one other virtual home agent and at least one other home home-agent associated with the at least one other public data network; and
   mapping the at least one other first tunnel to the at least one other second tunnel, the at least one other first tunnel and the at least one other second tunnel are concatenated to facilitate connecting the at least one other mobile device to the at least one other public data network, such that each of the specified public data network and the at least one other public data network are respectively associated with a concatenated tunnel.

6. The method of claim 1, the virtual home agent, which serves a specified public data network, is a service gateway.

7. The method of claim 1, the virtual home agent, which serves a specified public data network, is a non-access gateway.

8. The method of claim 1, the virtual home agent, which serves a specified public data network, is a visited packet data network.

9. The method of claim 1, the home home-agent is a packet data network gateway.

10. The method of claim 1, the message is at least one of a proxy binding update or a binding update and comprises at least a network access identifier that facilitates identifying at least one of the specified public data network or the mobile device.

11. The method of claim 1, further comprising:
creating a mapping of virtual home agents to respective public data networks; and
storing the mapping of virtual home agents to respective public data networks.

12. The method of claim 11, further comprising:
retrieving the mapping of virtual home agents to respective public data networks; and
evaluating a received message, comprising a network access identifier associated with the mobile device, and the mapping of virtual home agents to respective public data networks to facilitate determining the virtual home agent that serves the specified public data network.

13. A communications apparatus, comprising:
a memory that retains instructions related to transmission of a message, comprising information identifying a specified public data network, from a virtual home agent, which serves the specified public data network, to a home home-agent determined to be associated with the specified public data network to facilitate connecting a mobile device to the specified public data network at a predefined internet protocol space, the virtual home agent that serves a specified public data network is determined based at least in part on predefined virtual home agent-to-public data network mapping, wherein the virtual home agent comprises a mobile access gateway that connects directly to the home home-agent,
wherein the mobile device is connected to the specified public data network via a first tunnel created between a first mobile access gateway and the virtual home agent that serves the specified public data network and a second tunnel created between a second mobile access gateway associated with the virtual home agent and the home home-agent, the first tunnel is based on at least one of a client mobile internet protocol or a proxy mobile internet protocol and the second tunnel is based on a proxy mobile internet protocol; and
a processor, coupled to the memory, configured to execute the instructions retained in the memory.

14. The communications apparatus of claim 13, wherein the memory further retains instructions related to determination of the virtual home agent that serves the specified public data network based at least in part on predefined virtual home agent-to-public data network mapping and a received message comprising information identifying the specified public data network.

15. The communications apparatus of claim 13, wherein the memory further retains instructions related to:
formation of the first tunnel between the first mobile access gateway associated with the mobile device and the virtual home agent that serves the specified public data network,
formation of the second tunnel between the second mobile access gateway associated with the virtual home agent and the home home-agent, and
creation of a mapping of the first tunnel to the second tunnel, the first tunnel and second tunnel are concatenated to facilitate connecting the mobile device to the specified public data network.

16. The communications apparatus of claim 15, wherein the memory further retains instructions related to:
formation of at least one other first tunnel between the first mobile access gateway associated with at least one other mobile device and at least one other virtual home agent that serves at least one other public data network,
formation of at least one other second tunnel between the second mobile access gateway associated with the at least one other virtual home agent and at least one other home home-agent associated with the at least one other public data network, and
creation of a mapping of the at least one other first tunnel to the at least one other second tunnel, the at least one other first tunnel and the at least one other second tunnel are concatenated to facilitate connecting the at least one other mobile device to the at least one other public data network, such that each of the specified public data network and the at least one other public data network are associated with respective concatenated sets of tunnels.

17. The communications apparatus of claim 13, wherein the memory further retains instructions related to formation of a mapping of virtual home agents to respective public data networks, and storage of the mapping of virtual home agents to respective public data networks.

18. The communications apparatus of claim 17, wherein the memory further retains instructions related to retrieval of the mapping of virtual home agents to respective public data networks, and analysis of a received message, comprising a network access identifier associated with the mobile device, and the mapping of virtual home agents to respective public data networks to facilitate determining the virtual home agent that serves the specified public data network.

19. A communications apparatus that facilitates communication associated with a mobile device, comprising:
means for determining a virtual home agent that serves a specified public data network based at least in part on predefined virtual home agent-to-public data network mapping; and
means for transmitting a message, comprising information identifying the specified public data network, from the virtual home agent to a home home-agent discovered to be associated with the specified public data network to facilitate connecting the mobile device to the specified public data network at a predefined internet protocol space, the mobile device is connected to the specified public data network via a first tunnel created between a first mobile access gateway and the virtual home agent that serves the specified public data network and a second tunnel created between a second mobile access gateway associated with the virtual home agent and the home home-agent, the first tunnel is based on at least one of a client mobile internet protocol or a proxy mobile internet protocol and the second tunnel is based on a proxy mobile internet protocol, wherein the virtual home agent comprises the second mobile access gateway that connects directly to the home home-agent.

20. The communications apparatus of claim 19, further comprising:
   means for determining whether another virtual home agent serves the specified public data network if it is determined that an instant virtual home agent is not the virtual home agent that serves the specified public data network, based at least in part on the predefined virtual home agent-to-public data network mapping; and
   means for transmitting a home agent switch message if it is determined that the instant virtual home agent is not the virtual home agent that serves the specified public data network to facilitate transmitting a message, comprising information identifying the specified public data network, to another virtual home agent that serves the specified public data network.

21. The communications apparatus of claim 19, further comprising:
   means for evaluating a received message, comprising information that facilitates identifying the specified public data network, and the mapping of virtual home agents to respective public data networks to facilitate determining the virtual home agent that serves the specified public data network.

22. The communications apparatus of claim 19, the virtual home agent, which serves a specified public data network, is one of a service gateway, a non-access gateway, or a visited packet data network gateway.

23. The communications apparatus of claim 19, the home home-agent is a packet data network gateway.

24. A computer program product, comprising:
   a non-transitory computer-readable medium comprising code for:
   identifying a virtual home agent that serves a specified public data network based at least in part on predefined virtual home agent-to-public data network mapping; and
   transmitting a message, comprising information identifying the specified public data network, from the virtual home agent to a home home-agent determined to be associated with the specified public data network to facilitate connecting a mobile device to the specified public data network at a predefined internet protocol space, wherein the virtual home agent comprises a mobile access gateway that connects directly to the home home-agent,
   wherein the mobile device is connected to the specified public data network via a first tunnel created between a first mobile access gateway and the virtual home agent that serves the specified public data network and a second tunnel created between a second mobile access gateway associated with the virtual home agent and the home home-agent, the first tunnel is based on at least one of a client mobile internet protocol or a proxy mobile internet protocol and the second tunnel is based on a proxy mobile internet protocol.

25. The computer program product of claim 24, further comprising:
   a non-transitory computer-readable medium comprising code for:
   identifying whether another virtual home agent serves the specified public data network if it is determined that an instant virtual home agent, which has received a message that facilitates identifying the specified public data network, is not the virtual home agent that serves the specified public data network, based at least in part on the predefined virtual home agent-to-public data network mapping; and
   transmitting a home agent switch message if it is determined that the instant virtual home agent is not the virtual home agent that serves the specified public data network to facilitate redirecting a message, comprising information identifying the specified public data network, to another virtual home agent that serves the specified public data network.

26. The computer program product of claim 24, further comprising:
   a non-transitory computer-readable medium comprising code for:
   creating the first tunnel between the first mobile access gateway associated with the mobile device and the virtual home agent that serves the specified public data network;
   creating the second tunnel between the second mobile access gateway associated with the virtual home agent and the home home-agent; and
   mapping the first tunnel to the second tunnel; and
   concatenating the first tunnel and second tunnel to facilitate connecting the mobile device to the specified public data network.

27. The computer program product of claim 26, further comprising:
   a non-transitory computer-readable medium comprising code for:
   creating at least one other first tunnel between the first mobile access gateway associated with at least one other mobile device and at least one other virtual home agent that serves at least one other public data network;
   creating at least one other second tunnel between the second mobile access gateway associated with the at least one other virtual home agent and at least one other home home-agent associated with the at least one other public data network; and
   mapping the at least one other first tunnel to the at least one other second tunnel; and
   concatenating the at least one other first tunnel and the at least one other second tunnel to facilitate connecting the at least one other mobile device to the at least one other public data network, such that each of the specified public data network and the at least one other public data network are associated with respective concatenated sets of tunnels.

28. In a wireless communications system, an apparatus comprising:
   a processor configured to:
   determine a virtual home agent that serves a specified public data network based at least in part on predefined virtual home agent-to-public data network mapping; and
   transmit a message, comprising information identifying the specified public data network, from the virtual home agent to a home home-agent discovered to be associated with the specified public data network to facilitate creation of a concatenated set of tunnels utilized to connect a mobile device to the specified public data network at a predefined internet protocol space, wherein the virtual home agent comprises a mobile access gateway that connects directly to the home home-agent,
   wherein the mobile device is connected to the specified public data network via a first tunnel created between a first mobile access gateway and the virtual home agent that serves the specified public data network and a second tunnel created between a second mobile access gateway associated with the virtual home agent and the home home-agent, the first tunnel is based on at least one of a client mobile internet protocol or a proxy mobile internet protocol and the second tunnel is based on a proxy mobile internet protocol.

29. The apparatus of claim 28, the processor further configured to:
evaluate a received message, comprising information that facilitates identifying the specified public data network, and the predefined mapping of virtual home agents to respective public data networks to facilitate determination of the virtual home agent that serves the specified public data network;
determine whether another virtual home agent serves the specified public data network if it is determined that an instant virtual home agent is not the virtual home agent that serves the specified public data network, based at least in part on the predefined virtual home agent-to-public data network mapping; and
transmit a home agent switch message if it is determined that the instant virtual home agent is not the virtual home agent that serves the specified public data network to facilitate transmission of a message, comprising information identifying the specified public data network, to another virtual home agent that serves the specified public data network.

30. A method that facilitates communication associated with a mobile device, comprising:
transmitting a message comprising information that facilitates identifying a public data network with which the mobile device seeks to connect, to a first virtual home agent to facilitate determining if the first virtual home agent is a virtual home agent that serves the public data network; and
redirecting the message to transmit the message to another virtual home agent based at least in part on a received home agent switch message that at least one of indicates the first virtual home agent does not serve the public data network or identifies another virtual home agent that serves the public data network if it is determined that the first virtual home agent does not serve the public data network, to facilitate creation of a concatenated set of tunnels that facilitate connecting the mobile device to the public data network, wherein
the concatenated set of tunnels comprising a first tunnel created between a first mobile access gateway and the virtual home agent that serves the specified public data network and a second tunnel created between a second mobile access gateway associated with the virtual home agent and a home home-agent associated with the public data network, the first tunnel is based on at least one of a client mobile internet protocol or a proxy mobile internet protocol and the second tunnel is based on a proxy mobile internet protocol.

31. The method of claim 30, the first tunnel and the second tunnel are concatenated based at least in part on a mapping of the first tunnel to the second tunnel to facilitate connecting the mobile device to the public data network.

32. The method of claim 30, redirecting the message to transmit the message to another virtual home agent, further comprising:
redirecting the message to transmit the message to another virtual home agent based at least in part on the home agent switch message to facilitate creating a first tunnel that connects a mobile access gateway and the another virtual home agent and a second tunnel that connects the another virtual home agent and a home home-agent that is connected with the public data network, the first tunnel and second tunnel are concatenated based at least in part on a mapping of the first tunnel to the second tunnel to facilitate connecting the mobile device to the public data network.

33. The method of claim 30, further comprising:
receiving a request to connect to the public data network from the mobile device via a wireless communication network; and
selecting the first virtual home agent from a list of known virtual home agents to facilitate transmitting the message to the first virtual home agent.

34. The method of claim 30, the first tunnel is based on at least one of a client mobile internet protocol or a proxy mobile internet protocol and the second tunnel is based on a proxy mobile internet protocol.

35. The method of claim 30, the virtual home agent, which serves a specified public data network, is one of a service gateway, a non-access gateway, or a visited packet data network gateway.

36. The method of claim 30, the home home-agent is a packet data network gateway.

37. A communications apparatus, comprising:
a memory that retains instructions related to:
communication of a message comprising information that facilitates identifying a public data network to which a mobile device seeks to connect, to a first virtual home agent to facilitate determination of whether the first virtual home agent is a virtual home agent that serves the public data network, and
redirection of the message to communicate the message to another virtual home agent based at least in part on a received home agent switch message that at least one of indicates the first virtual home agent does not serve the public data network or identifies another virtual home agent that serves the public data network if it is determined that the first virtual home agent does not serve the public data network, to facilitate creation of a concatenated set of tunnels that facilitate connection of the mobile device to the public data network, wherein the concatenated set of tunnels comprising a first tunnel created between a first mobile access gateway and the virtual home agent that serves the specified public data network and a second tunnel created between a second mobile access gateway associated with the virtual home agent and a home home-agent associated with the public data network; and
a processor, coupled to the memory, configured to execute the instructions retained in the memory.

38. The communications apparatus of claim 37, wherein the communication of the message facilitates formation of a first tunnel that connects a mobile access gateway and the first virtual home agent and a second tunnel that connects the first virtual home agent and a home home-agent that is connected with the public data network, the first tunnel and second tunnel are concatenated based at least in part on a mapping of the first tunnel to the second tunnel to facilitate connecting the mobile device to the public data network.

39. The communications apparatus of claim 37, wherein the redirection of the message to communicate the message to another virtual home agent facilitates formation of a first tunnel that connects a mobile access gateway and the another virtual home agent and a second tunnel that connects the another virtual home agent and a home home-agent that is connected with the public data network, the first tunnel and second tunnel are concatenated based at least in part on a mapping of the first tunnel to the second tunnel to facilitate connecting the mobile device to the public data network.

40. The communications apparatus of claim 37, wherein the memory further retains instructions related to:
reception of a request to connect to the public data network from the mobile device via a wireless communication network; and
selection of the first virtual home agent from a list of known virtual home agents to facilitate communication of the message to the first virtual home agent.

41. A communications apparatus that facilitates communication associated with a mobile device, comprising:
means for transmitting a message comprising information that facilitates identifying a public data network with which the mobile device seeks to connect, to a first virtual home agent to facilitate determining if the first virtual home agent is a virtual home agent that serves the public data network; and
means for redirecting the message to transmit the message to another virtual home agent based at least in part on a received home agent switch message that at least one of indicates the first virtual home agent does not serve the public data network or identifies another virtual home agent that serves the public data network if it is determined that the first virtual home agent does not serve the public data network, to facilitate creation of a concatenated set of tunnels that facilitate connecting the mobile device to the public data network,
wherein the concatenated set of tunnels comprising a first tunnel created between a first mobile access gateway and the virtual home agent that serves the specified public data network and a second tunnel created between a second mobile access gateway associated with the virtual home agent and a home home-agent associated with the public data network.

42. The communications apparatus of claim 41, further comprising:
means for receiving a request to connect to the public data network from the mobile device via a wireless communication network; and
means for selecting the first virtual home agent from a list of known virtual home agents to facilitate transmitting the message to the first virtual home agent.

43. The communications apparatus of claim 41, the concatenated set of tunnels comprising a first tunnel created between a mobile access gateway and at least one of the virtual home agent or the another virtual home agent, which serves the public data network, and a second tunnel created between at least one of the virtual home agent or the another virtual home agent and a home home-agent connected with the public data network, the first tunnel is based on at least one of a client mobile internet protocol or a proxy mobile internet protocol and the second tunnel is based on a proxy mobile internet protocol.

44. A computer program product, comprising:
a non-transitory computer-readable medium comprising code for:
communicating a message comprising information related to a public data network to which a mobile device seeks to connect, to a first virtual home agent to facilitate determining whether the first virtual home agent is a virtual home agent that serves the public data network; and
redirecting the message to communicate the message to another virtual home agent based at least in part on a received home agent switch message that at least one of indicates the first virtual home agent does not serve the public data network or identifies another virtual home agent that serves the public data network if it is determined that the first virtual home agent does not serve the public data network, to facilitate creating a linked set of tunnels that facilitate connection of the mobile device to the public data network,
wherein the concatenated set of tunnels comprising a first tunnel created between a first mobile access gateway and the virtual home agent that serves the specified public data network and a second tunnel created between a second mobile access gateway associated with the virtual home agent and a home home-agent associated with the public data network.

45. The computer program product of claim 44, further comprising:
a non-transitory computer-readable medium comprising code for:
receiving a request to connect to the public data network from the mobile device via a wireless communication network; and
selecting the first virtual home agent from a list of known virtual home agents to facilitate transmitting the message to the first virtual home agent.

46. In a wireless communications system, an apparatus comprising:
a processor configured to:
transmit a message comprising information that facilitates identifying a public data network with which a mobile device seeks to connect, to a first virtual home agent to facilitate determining if the first virtual home agent is a virtual home agent that serves the public data network; and
re-transmit the message to another virtual home agent based at least in part on a received home agent switch message that at least one of indicates the first virtual home agent does not serve the public data network or identifies another virtual home agent that serves the public data network if it is determined that the first virtual home agent does not serve the public data network, to facilitate creation of a concatenated set of tunnels that facilitate connecting the mobile device to the public data network,
wherein the concatenated set of tunnels comprising a first tunnel created between a first mobile access gateway and the virtual home agent that serves the specified public data network and a second tunnel created between a second mobile access gateway associated with the virtual home agent and a home home-agent associated with the public data network.

47. The apparatus of claim 46, the processor further configured to:
receive a request to connect to the public data network from the mobile device via a wireless communication network; and
select the first virtual home agent from a list of known virtual home agents to facilitate transmitting the message to the first virtual home agent.

* * * * *